(12) United States Patent
Kato et al.

(10) Patent No.: US 6,647,314 B2
(45) Date of Patent: Nov. 11, 2003

(54) NUMERICALLY CONTROLLED SYSTEM AND NUMERICAL CONTROL METHOD

(75) Inventors: Kiyotaka Kato, Tokyo (JP); Kenji Iriguchi, Tokyo (JP); Susumu Matsubara, Tokyo (JP); Nobuyuki Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 298 days.

(21) Appl. No.: 09/793,464

(22) Filed: Feb. 27, 2001

(65) Prior Publication Data

US 2001/0021880 A1 Sep. 13, 2001

(30) Foreign Application Priority Data

Mar. 9, 2000 (JP) ........................................ 2000-064437

(51) Int. Cl.[7] .............................................. G06F 19/00
(52) U.S. Cl. ........................ 700/187; 700/159; 700/182; 318/571
(58) Field of Search ................................ 700/159–160, 700/173–184, 186, 188; 318/571

(56) References Cited

PUBLICATIONS

Shirase et al., "Trial Of NC Programless Milling For A Basic Autonomous CNC Machine Tool", Proceedings of the 2000 Japan–USA Flexible Automation Conference, Jul. 2000, pp. 1–7.

*Primary Examiner*—Leo Picard
*Assistant Examiner*—Douglas S. Lee
(74) *Attorney, Agent, or Firm*—Leydig, Voit & Mayer, Ltd.

(57) ABSTRACT

There are provided a curved-surface state evaluating unit for forming evaluation data by arranging, virtually, a tool on a given scheduled path locus not interfering with a processed surface of a processing object and by setting tool path sample points to evaluate a state of the processed surface, a tool position data forming unit having a command speed deciding portion for deciding a command speed, at which the tool is moved, based on evaluation data of the tool path sample points, and a tool position deciding portion for deciding the tool position based on the command speed and a shape of a worked surface such that the tool does not interfere with the worked surface, wherein operation of the curved-surface state evaluating unit and operation of the tool position data forming unit are executed in real time.

5 Claims, 15 Drawing Sheets

NUMERICALLY CONTROLLED SYSTEM AND NUMERICAL CONTROL METHOD

BACKGROUND OF THE INVENTION

1. Field of the Invention

The present invention relates to the improvement of a numerically controlled system and a numerical control method employed to control a machine tool, for example.

2. Description of the Related Art

In the prior art, upon working a die or mould having a free-form surface, tool path data are formed by representing approximately the tool path by infinitesimal segments such as a straight line, a circular arc, a curve, etc. when the tool is moved virtually by using the CAD/CAM system so as to come into contact with the free-form surface, and then the cutting is executed by providing such tool path data to the numerically controlled machine tool.

In general, in case the curved surface working is executed by the numerically controlled machine tool, the number of tool path data items consisting of the infinitesimal segments and formed by the CAD/CAM system is enormous. In particular, in recent working by the high speed cutting, a method is employed so that a surface close to a specular surface can be produced by reducing the working pick feed to be as small as possible and thus the burden of the subsequent polishing step can be reduced or the polishing step can be omitted.

In such working, the working precision must be improved by increasing the number of the tool path data items prepared by the CAD/CAM system. Therefore, the number of the tool path data items prepared by the CAD/CAM system is increased and also the data transferred to the numerically controlled system becomes enormous.

Also, sometimes correction of the tool diameter is needed on the spot because tool wear and tool exchange. However, in three-dimensional curved-surface working, it is difficult to correct an offset distance since such a surface is often cut by a ball end mill. Therefore, since the enormous number of tool path data must be calculated again and again using the CAD/CAM system, the operation efficiency is substantially reduced.

As a system to overcome the above problem, there exists the system set forth in Patent Application Publication (KOKAI) Hei 11-15513, for example. In this system, the mould shape data generating function portion for generating the mould shape data based on the curved surface data indicating the curved surface to be worked (referred simply to as "curved surface" or "worked curved surface" hereinafter) and the tool path data forming function portion for forming the tool path data from the mould shape data are provided to the calculation processing unit. Then, the tool path data can be output in an on-line fashion from the mould shape data generating function portion to the tool path data forming function portion and other cutting devices. Also, the formation of the tool path data and the cutting can be executed concurrently.

However, in the numerically controlled system of the prior art, since the tool path data are formed from the mould shape data, a large amount of tool path data must also be formed. Also, since evaluation of the worked curved surface is not performed, the working precision cannot be improved by setting appropriately the working speed, i.e., the moving speed of the tool, in response to the worked curved surface.

In addition, if the formation of the tool position data is not in time, movement of the tool must be stopped in the course of working or refuge of the tool must be made. If the tool is stopped in motion or escaped in the middle of working, sometimes that portion remains as the scratch-like tool trace.

SUMMARY OF THE INVENTION

The present invention has been made to overcome above problems, and it is an object of the present invention to provide a numerically controlled system and a numerically controlling method described as follows.

a. The preparation of tool path data transmitted to the numerically controlled system from a CAD/CAM system in the prior art can be omitted, and a tool position as a process applying portion position can be decided based on a shape of a worked surface of a working object as a processed surface of a processing object.

b. It is not needed that the conventional tool path data should be calculated again by using the CAD/CAM system to change the conditions of the process applying portion, more particularly, to correct the tool diameter because of the tool wear or the tool exchange, for example.

c. The speed of the process applying portion can be set appropriately in accordance with the state of the processed surface, while suppressing the increase of the number of the tool position data as the process applying portion position data.

d. The generation of the scratch-like trace, etc. of the process applying portion can be prevented by preventing generation of the stop or the refuge of the process applying portion in the middle of process.

e. The processed quality can be improved without damage of the productivity.

In order to achieve the above object, a numerically controlled system of the present invention comprises evaluating means for forming evaluation data by arranging virtually a process applying portion of a system to be numerically controlled on a given scheduled path locus not to interfere with a processed surface of a processing object and by setting a plurality of evaluation points to evaluate a state of the processed surface; command speed deciding means for deciding a command speed, at which the process applying portion is moved, based on the evaluation data; and process applying portion position data forming means having process applying portion position deciding means for deciding a process applying portion position to be given to the numerically controlled system based on the command speed and a shape of the processed surface such that the process applying portion does not interfere with the processed surface; wherein an operation of the evaluating means and an operation of the process applying portion position data forming means are executed in real time.

Therefore, since the command speed at which the process applying portion is moved is decided based on the evaluation data, the appropriate command speed can be decided in response to the state of the processed surface. Also, since the process applying portion position is decided by arranging virtually the process applying portion to come precisely into contact with the processed surface, increase of an amount of data to be prepared can be suppressed. In addition, since the formation of the evaluation data and the decision of the process applying portion position are executed in real time, the overall processing time can be shortened. Accordingly, the quality of the process can be improved without damage of the productivity.

Then, the process applying portion position data forming means includes process applying portion position data storing means for storing process applying portion position data and process applying portion position data number monitoring means for issuing a deceleration command when a data number stored in the process applying portion position data storing means is less than a predetermined value, and the command speed deciding means decides the command speed based on a moving standard speed and the deceleration command.

Therefore, since the process applying portion speed is decelerated by issuing the deceleration command when the data number of the process applying portion positions is reduced smaller than the predetermined value, it can be prevented that the decision of the process applying portion position is not performed in time in the middle of processing and thus the movement of the process applying portion is stopped. As a result, it is possible to prevent generation of the scratch-like tool traces, etc. due to the stop of the tool.

In addition, the evaluating means includes evaluation data storing means for calculating a curvature of the processed surface of a processing object at evaluation points and a moving standard speed of the process applying portion to correspond to the curvature as evaluation data and storing the evaluation data, and evaluation progress state monitoring means for issuing a speed limiting command when a number of the evaluation data stored in the evaluation data storing means is reduced smaller than a predetermined value, and the command speed deciding means decides the command speed based on a moving reference speed and the speed limiting command.

Therefore, since the process applying portion speed is decelerated by issuing the deceleration command when the number of the evaluation data stored in the evaluation data storing means is reduced smaller than the predetermined value, it can be prevented that the decision of the process applying portion position is not performed in time in the middle of processing and thus the movement of the process applying portion is stopped. As a result, generation of the scratch-like tool traces, etc. due to the stop of the tool can be prevented.

Further, the evaluating data storing means stores the evaluation data in unit of segment that is classified from a predetermined start point to a predetermined end point on a scheduled path locus, and evaluation progress state monitoring means for issuing a speed limiting command when a unit number of the segment stored in the evaluation data storing means is reduced smaller than a predetermined value.

Therefore, since the process applying portion speed is decelerated by issuing the deceleration command when the unit number of the segment in the evaluation data stored in the evaluation data storing means is reduced smaller than the predetermined value, it can be prevented that the decision of the process applying portion position is not performed in time in the middle of segment and thus the movement of the process applying portion is stopped. In addition, since normally no trouble is caused by stopping once the process applying portion at the end point of the segment, it can be prevented that the process applying portion is stopped in the middle of the segment by handling the evaluation data in unit of segment. As a result, it is possible to prevent generation of the scratch-like tool traces, etc. due to the stop of the tool by preventing stop of the tool in the course of the segment.

Besides, a numerically controlling method of the present invention comprises the steps of forming evaluation data by arranging virtually a process applying portion of a system to be numerically controlled on a given scheduled path locus not to interfere with a processed surface of a processing object and by setting a plurality of evaluation points to evaluate a state of the processed surface; deciding a command speed, at which the process applying portion is moved, based on the evaluation data; and deciding a process applying portion position to be given to the numerically controlled system based on the command speed and a shape of the processed surface such that the process applying portion does not interfere with the processed surface; wherein formation of the evaluation data and decision of the process applying portion position are executed in real time.

Therefore, since the command speed at which the process applying portion is moved is decided based on the evaluation data, the appropriate command speed can be decided in response to the state of the processed surface. Also, since the process applying portion position is decided by arranging virtually the process applying portion to come precisely into contact with the processed surface, increase of an amount of data to be prepared can be suppressed. In addition, since the formation of the evaluation data and the decision of the process applying portion position are executed in real time, the overall processing time can be shortened. Accordingly, the quality of the process can be improved without damage of the productivity.

DETAILED DESCRIPTION OF THE PREFERRED EMBODIMENTS

Now, a description will be given in more detail of preferred embodiments of the invention with reference to the accompanying drawings.

(Embodiment 1)

Figure 1:
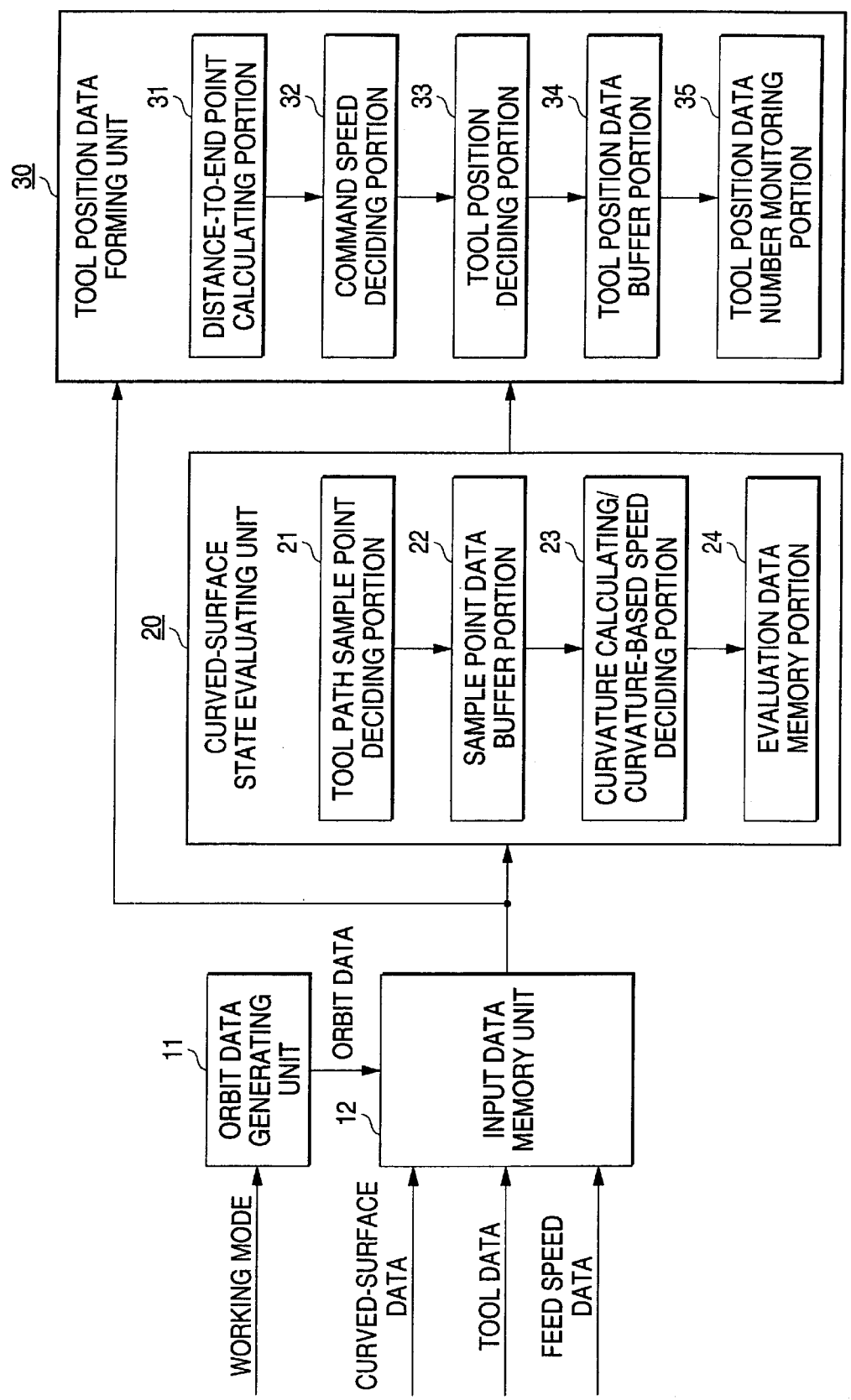
FIG. 1 is a block diagram showing a configuration of a numerically controlled system according to an embodiment of the present invention.

FIG. 1 is a block diagram showing a configuration of a numerically controlled system according to an embodiment of the present invention. In FIG. 1, an orbit data generating unit 11 generates orbit data, that define scheduled path locus on an XY plane on which the tool of the numerically controlled machine tool should be moved, based on the moving mode, i.e., the working mode by which the curved-surface should be worked, and then outputs the orbit data to an input data memory unit 12. Details of the scheduled path locus will be described later.

The curved-surface of the working object is an example of the processed surface of the processing object in the present invention. The numerically controlled machine tool to be numerically controlled is an example of the system to be numerically controlled in the present invention. The tool is an example of the process applying portion of the system to be numerically controlled in the present invention.

The input data memory unit 12 stores input data such as the orbit data generated by the above orbit data generating unit 11, three-dimensional curved-surface data, tool data, feed speed data, etc., that are necessary for the numerically controlled working. Where the above curved surface data represent shapes of the worked surface of the working object, and contain NUIRBS (Non Uniformed Rational B-Spline) curved-surface, etc. In the case of this NURBS curved-surface, rank, knot vector, control point, and weight are input as the curved-surface data. But any curved-surface data may be employed.

Data such as tool type, e.g., ball end mill, flat end mill, radial end mill, etc., tool diameter of the tool, etc. are input as the tool data. The feed speed data means feed speed information of the tool.

A curved-surface state evaluating unit 20 comprises a tool path sample point deciding portion 21, a sample point data buffer portion 22, a curvature calculating/curvature-based speed deciding portion 23, and an evaluation data memory portion 24. The tool path sample point deciding portion 21 decides the tool path sample points as the evaluation points to evaluate the curved surface, based on the curved-surface data. The sample point data buffer portion 22 stores temporarily a plurality of tool path sample points decided by the tool path sample point deciding portion 21.

Where the tool path sample point means the tool position when the tool is virtually arranged on X, Y coordinates of the sampling points on the scheduled path locus to come just into contact with the curved-surface (see sampling points sp(1), sp(2), . . . , sp(j), evaluation points ep(1), ep(2), . . . , ep(j) in FIG. 8 described later).

The curvature calculating/curvature-based speed deciding portion 23 evaluates the condition of the curved-surface, e.g., the shape of the curved-surface to be worked successively based on the curved-surface data stored in the input data memory unit 12 to correspond to the tool path sample points, and then decides the curvature in each portion of the curved surface and the curvature-based speed in response to the curvature. The evaluation data memory portion 24 stores the curvature and the curvature-based speed as the evaluation data derived by the curvature calculating/curvature-based speed deciding portion 23 in response to the tool path sample points.

A tool position data forming unit 30 serving as the process applying portion position data forming unit decides the curvature-based speed at the current tool position by referring to the curvature-based speed at the tool path sample points. The command speed is decided from the curvature-based speed and the safety speed (details are described later), and then the interference avoidance calculation between the tool and the curved surface is executed based on the command speed to then calculate the tool position sequentially. The tool position is given by the X, Y, Z axis coordinates representing the tool position to be output by the numerically controlled system every predetermined time interval. A collection of the coordinates representing the tool position is the tool position data.

In addition, the tool position data forming unit 30 includes a distance-to-end point calculating portion 31, a command speed deciding portion 32, a tool position deciding portion 33, a tool position data buffer portion 34, and a tool position data number monitoring portion 35. The distance-to-end point calculating portion 31 calculates a distance from the current tool position to an end point. The end point indicates discontinuity areas of the scheduled path locus that are normally treated as a plurality of moving commands in the concerned numerically controlled system. For example, points OP2, OP4, OP6 in FIG. 3A and points OP2, OP3, OP4, etc. in FIG. 3B, described later, correspond to the end point.

The command speed deciding portion 32 calculates the safety speed from the current tool position and the distance to the end point calculated by the distance-to-end point calculating portion 31, and then decides the lower speed of the safety speed and the curvature-based speed calculated by the curved-surface state evaluating unit 20 as the command speed. The safety speed is the allowable maximum speed that allows the tool to stop safely until the tool comes up to the end point when the tool is decelerated in the range of the allowable acceleration of the machine.

The tool position deciding portion 33 decides the tool position as the time-series position coordinates of the tool, via which the tool traces sequentially in working the curved surface, based on the command speed and the curved-surface data. The tool position data buffer portion 34 stores temporarily the tool position decided by the tool position deciding portion 33 and sends it to a servo controller (not shown) as occasion demands.

The tool position data number monitoring portion 35 monitors the number of the tool position data in the tool position data buffer portion 34 of the tool position data forming unit 30, and then decides the succeeding tool position by adjusting the command speed in answer to the number of the tool position data (see steps S42 to S44 in FIG. 10 described later).

The tool position data forming unit 30 is constructed as above.

Based on the tool position data received from the tool position data buffer portion 34 of the tool position data forming unit 30 as the digital signals representing the tool position, the servo control portion (not shown) calculates pulse numbers $\Delta X$, $\Delta Y$, $\Delta Z$, that are equivalent to tool moving values in the X, Y, Z axis direction respectively, from differences between the coordinates of the currently observed tool position (referred to as the "current tool position" hereinafter) and the coordinates of the succeeding tool position, and then controls a servo motor.

In the above configuration, the curved-surface state evaluating unit 20 calculates the curvature and the curvature-based speed at the tool path sample points while forming the data of the tool path sample points, and the tool position data forming unit 30 forms the tool position data by using the above curvature-based speed. The above operations are carried out in real time, nevertheless decision of the curvature-based speed by the curved-surface state evaluating unit 20 is executed slightly prior to the formation of the tool position data by the tool position data forming unit 30.

Figure 2:
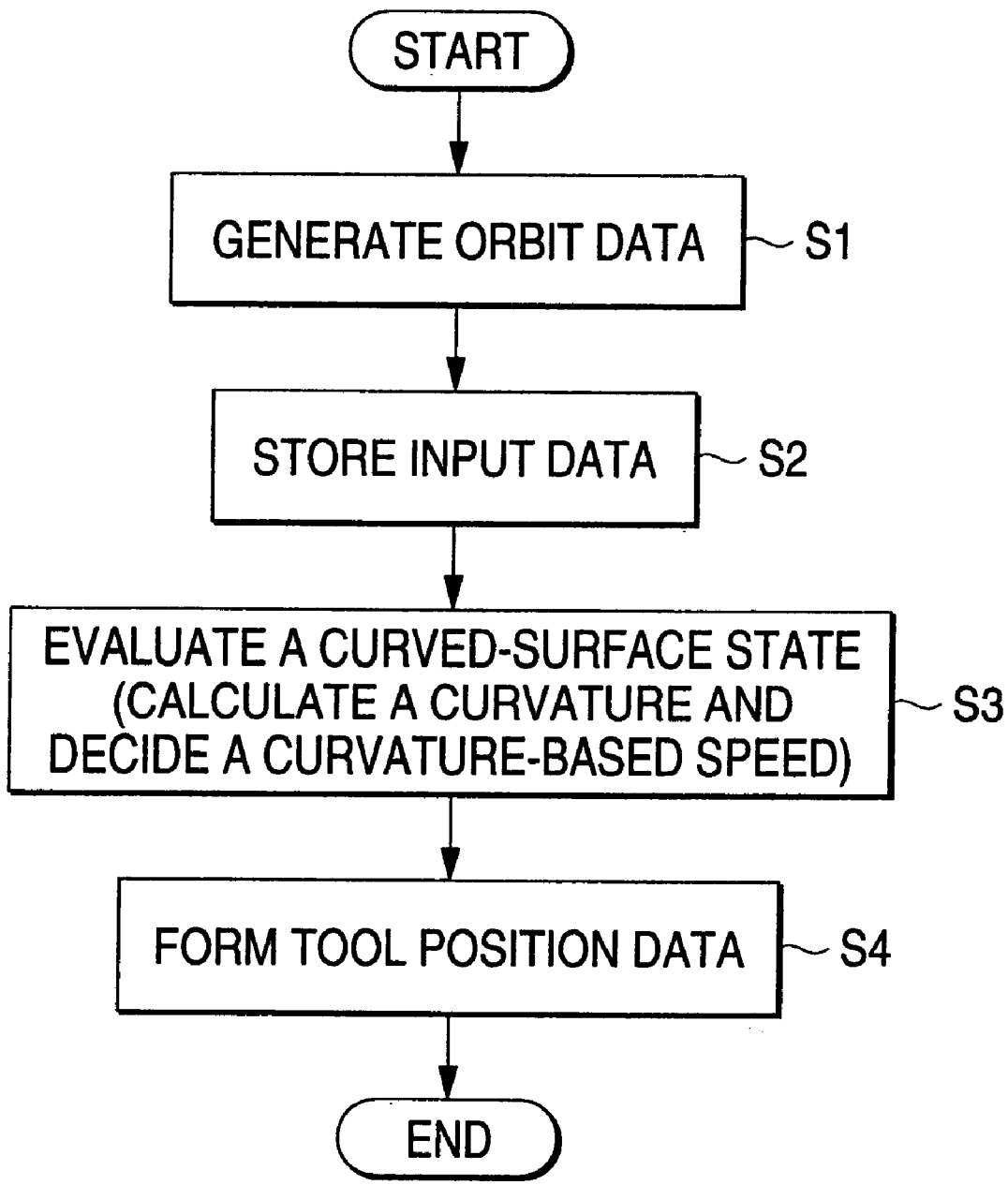
FIG. 2 is a flowchart showing an overall operation of the numerically controlled system.
Figure 3A:
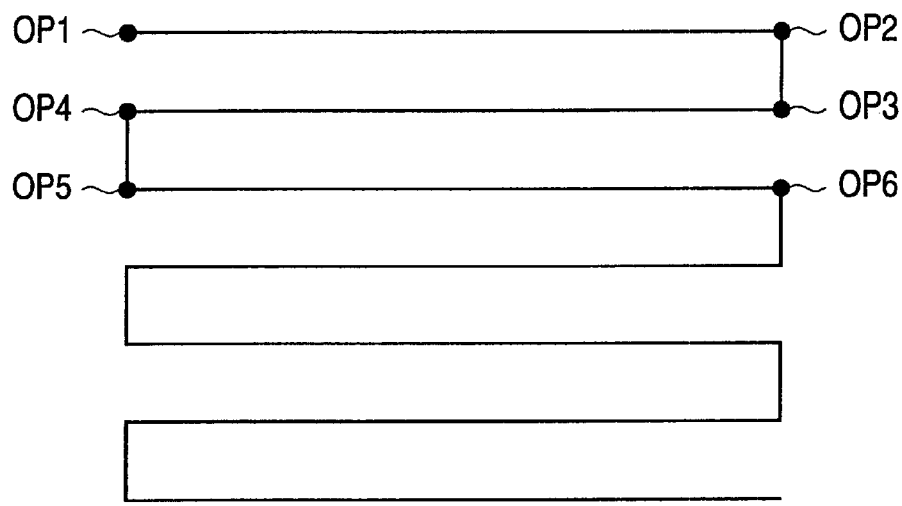
FIGS. 3A and 3B are views showing an example of working modes.
Figure 3B:
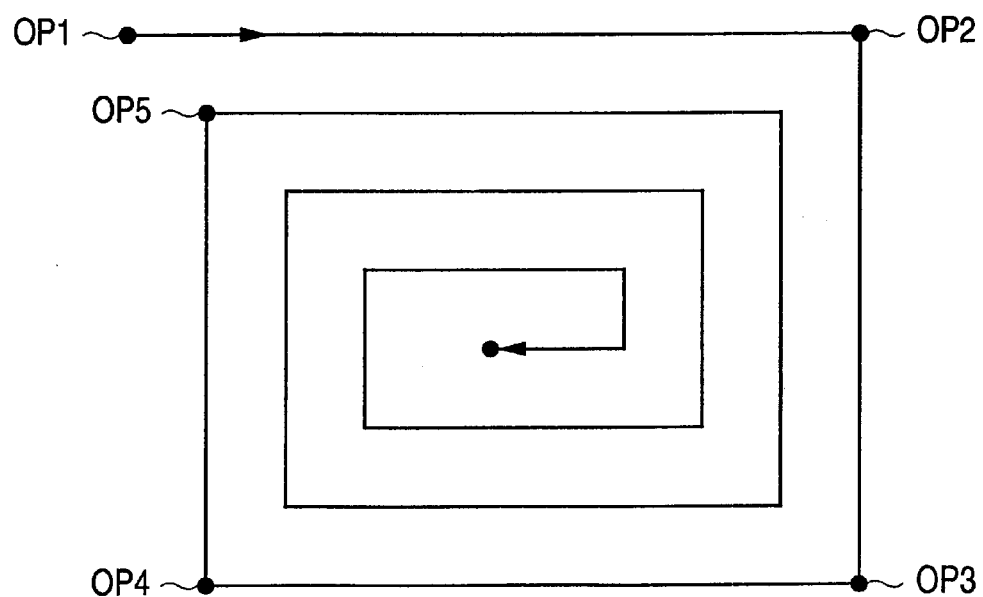
Figure 4:
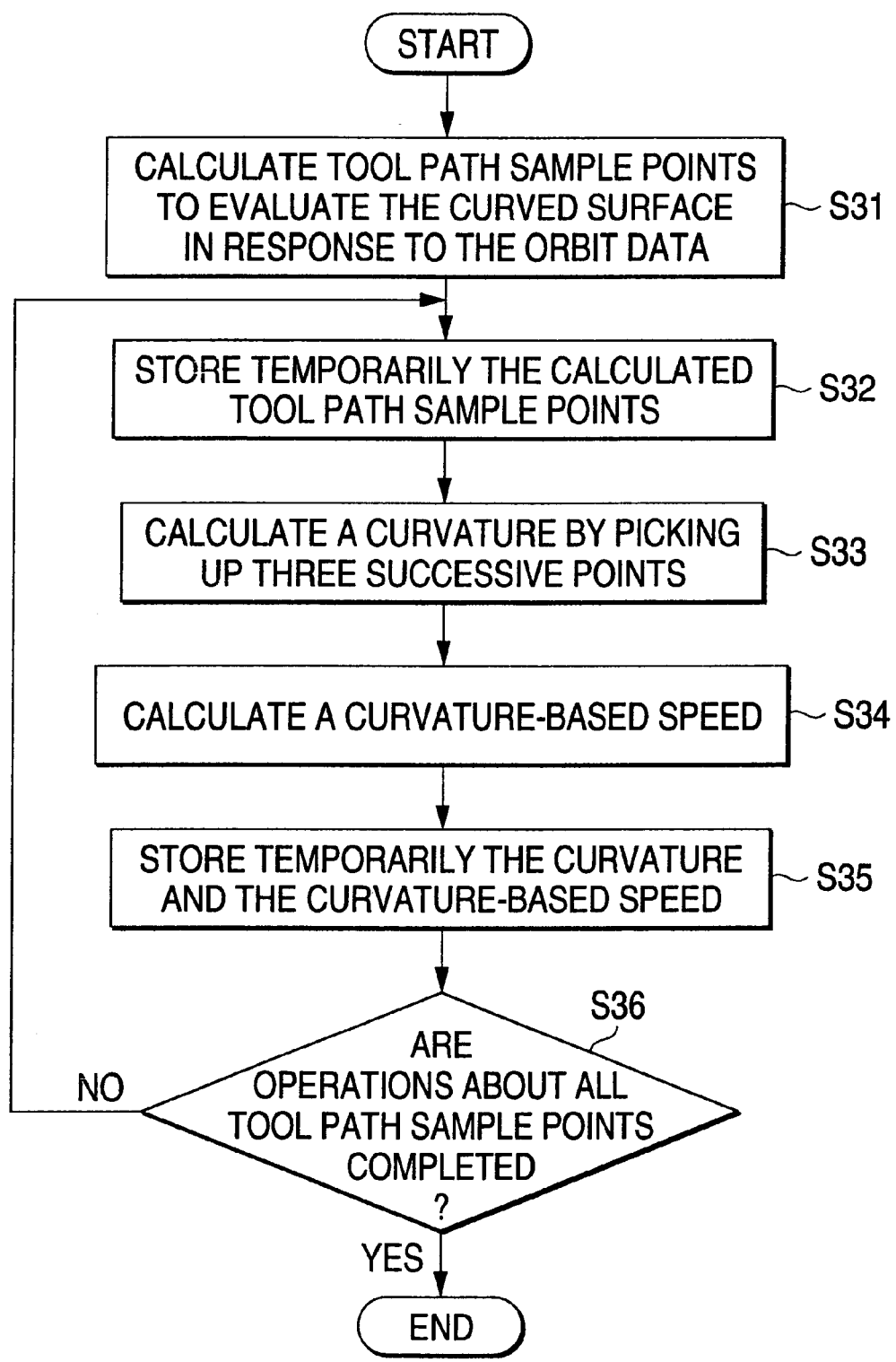
FIG. 4 is a flowchart showing an operation of a curved-surface state evaluating unit in FIG. 1.
Figure 5:
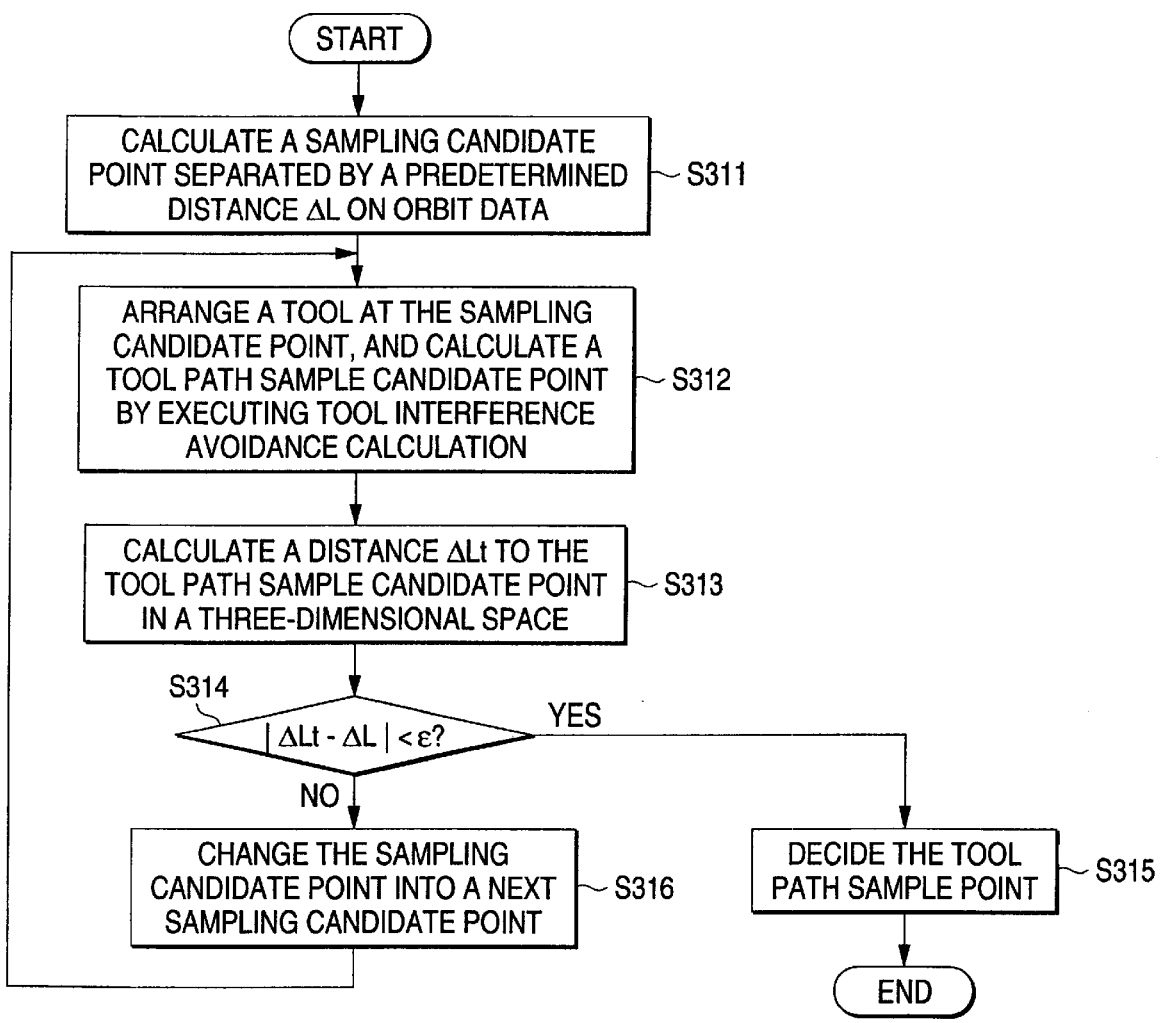
FIG. 5 is a flowchart showing an operation to calculate a tool path sample point in the curved-surface state evaluating unit.

Next, an operation will be explained hereunder. First an overall rough operation will be explained, and then detailed operations of respective portions will be explained. FIG. 2 is a flowchart showing an overall operation of the numerically controlled system. FIGS. 3A and 3B are views showing an example of working modes. FIG. 4 is a flowchart showing an operation of the curved-surface state evaluating unit. FIG. 5 is a flowchart showing a detail operation to calculate the tool path sample point in step S31 in FIG. 4.

Figure 6A:
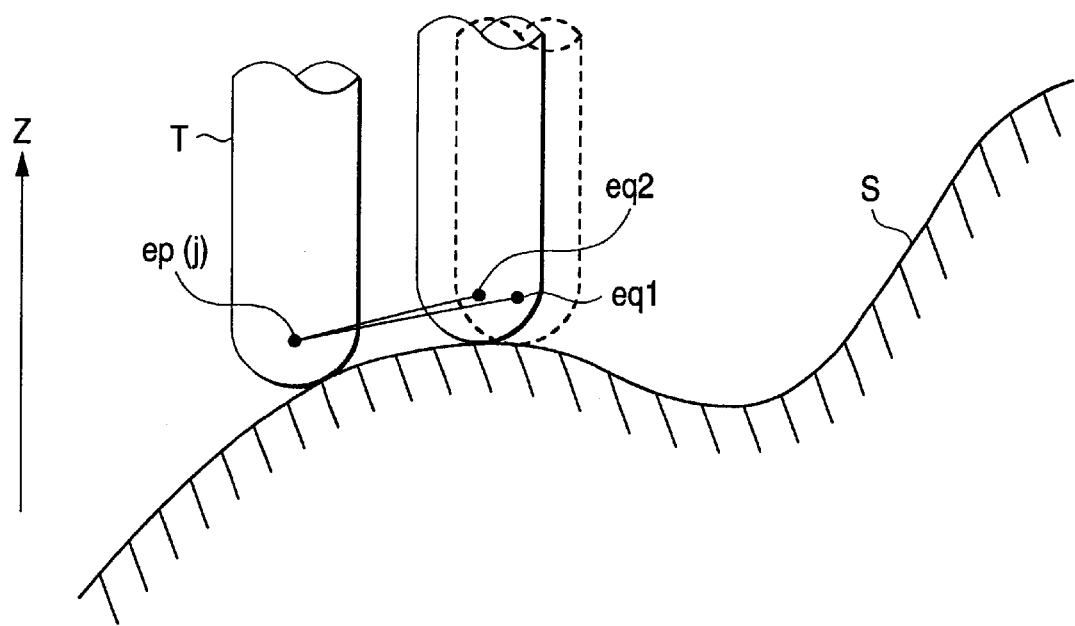
FIGS. 6A and 6B are views showing a concept to calculate a succeeding tool path sample point from a current tool path sample point on a curved surface.
Figure 6B:
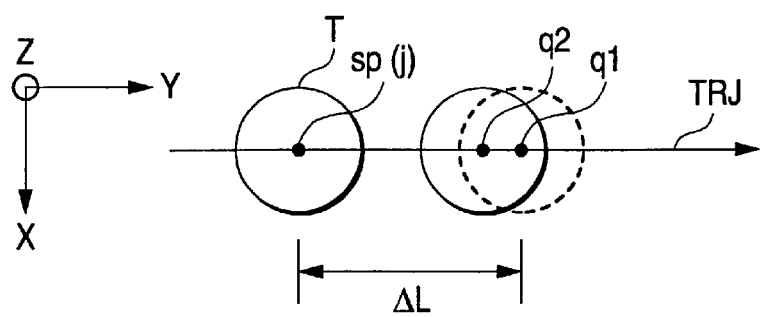
Figure 7A:
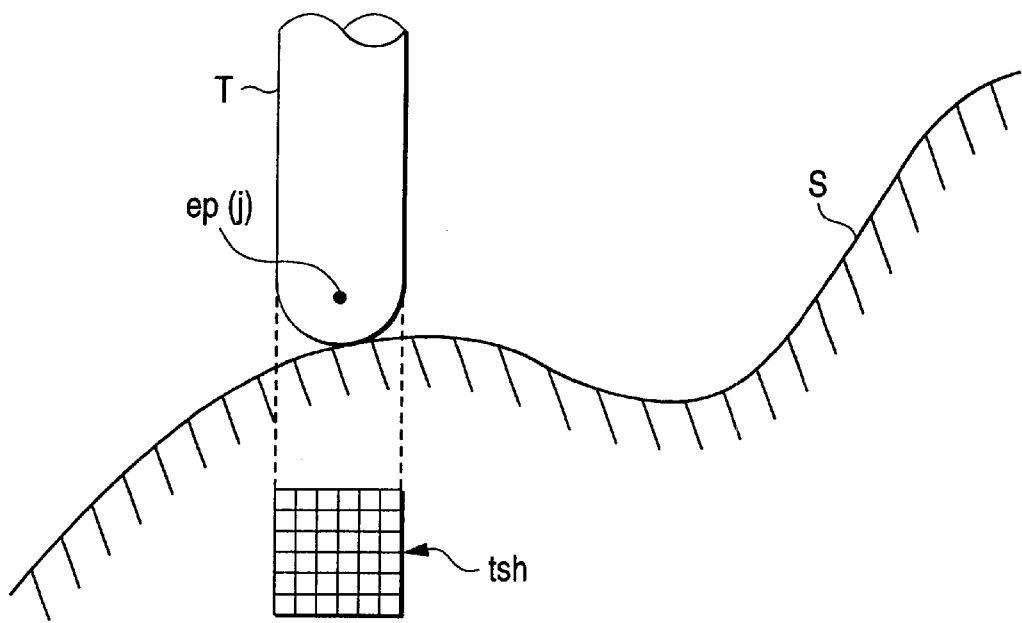
FIGS. 7A and 7B are views showing an example of tool interference avoidance calculation.
Figure 7B:
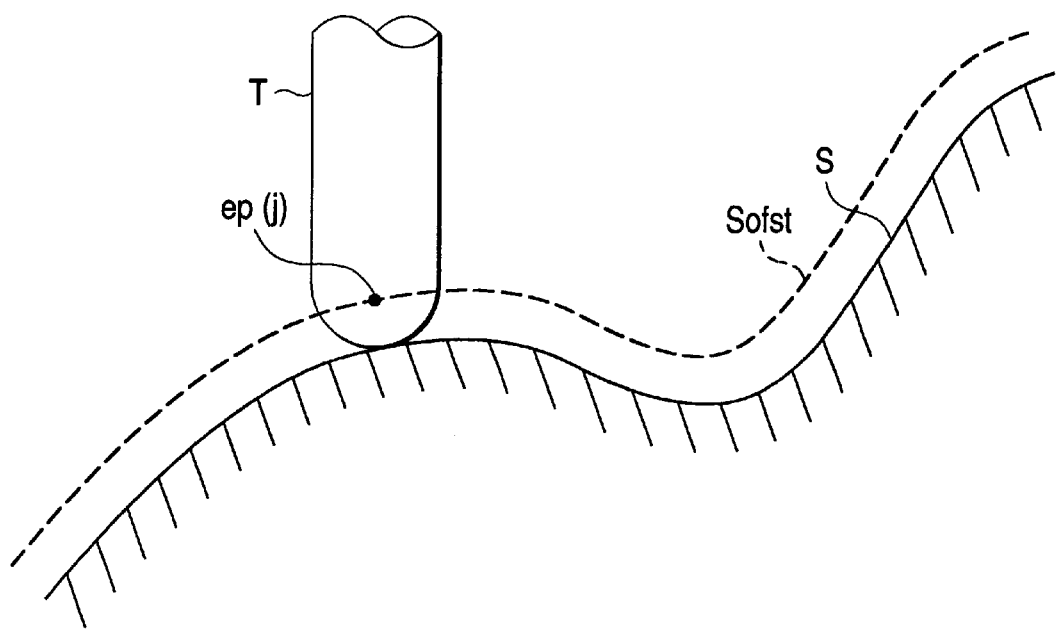

FIGS. 6A and 6B are views showing a concept to calculate the succeeding tool path sample point separated from the current tool path sample point on the curved surface. FIG. 6A shows the YZ-plane and FIG. 6B shows the XY-plane. FIGS. 7A and 7B are views showing an example of tool interference avoidance calculation. FIG. 8 is a view showing the tool path sample points calculated to evaluate the curved surface. FIG. 9 is a view showing a relationship between the tool path sample points and the tool position.

In the following, the overall operation will be explained with reference to the flowchart in FIG. 2, a detailed operation in step S3 in FIG. 4 will be explained with reference to the flowchart in FIG. 4, and a detailed operation in step S31 in FIG. 4 will be explained with reference to the flowchart in FIG. 5. In addition, a detailed operation in step S34 in FIG. 4 will be explained with reference to the flowchart in FIG. 10 hereunder.

First, the overall operation will be explained with reference to the flowchart in FIG. 2.

In step S1, the orbit data generating unit 11 generates the orbit data based on the working mode as the given processing mode. The working mode must be set to work the curved-surface. In step S1, the orbit data are generated based on this set working mode.

The scheduled path locus is given as the locus on the XY-plane according to the working mode, and the tool is moved along this scheduled path locus. As the working mode, there area zigzag working mode, a spiral working mode, a spline working mode, a circular arc working mode, etc.

FIGS. 3A and 3B show such working modes, wherein FIG. 3A shows an example of the zigzag working mode of the scheduled path locus that is defined in a zigzag fashion on the XY-plane, and FIG. 3B shows the spiral working mode of the scheduled path locus that is defined spirally on the XY-plane.

If the working mode is set by giving the data such as a pitch, etc., the scheduled path locus can be obtained as the orbit on the XY-plane such as a point OP1 to a point OP2, the point OP2 to a point OP3, the point OP3 to a point OP4, . . . in FIG. 3A or 3B.

The input data memory unit 12 stores the input data such as the orbit data input from the orbit data generating unit 11, the curved-surface data, the tool data, the feed speed data, etc. (step S2). The curved-surface state evaluating unit 20 evaluates the state of the curved-surface to be worked subsequently based on the curved-surface data stored in the input data memory unit 12, then sets the tool path sample points, then decides the curvature and the curvature-based speed as the evaluation data at the tool path sample points, and then stores them (step S3).

In step S31 of FIG. 4, the tool path sample points to evaluate the curved surface in response to the scheduled path locus are calculated. This step S31 will be explained in detail later.

The tool path sample points calculated as above are stored temporarily in the sample point data buffer portion 22 (step S32).

Then, three successive points are picked up from the tool path sample points stored in the sample point data buffer portion 22, and then the curvature of the circular arc passing through these three point is calculated (step S33). The curvature-based speed is calculated in response to this curvature (step S34). The curvature and the curvature-based speed are stored temporarily (step S35). These operations are repeated until such operations about all tool path sample points are completed (step S36).

In above step S34, the curvature-based speed is calculated by looking up the curvature-based speed table in which respective speeds are defined previously in response to the curvatures. The curvature-based speed is defined previously in response to the curvature such that the tool can pass through at a slow speed when the curvature is large while the tool can pass through at a high speed when the curvature is small. In this case, the curvature-based speed may be employed by using the computational expression in place of this table.

The evaluation of the curved-surface state is performed slightly prior to the formation of the tool position data described later but concurrently with such formation. The evaluation results are sent from the curved-surface state evaluating unit 20 to the tool position data forming unit 30 in real time.

Then, the detailed operation in step S31 in FIG. 4 will be explained with reference to a flowchart in FIG. 5 hereunder. That is, in step S311 in FIG. 5, a sampling candidate point q1 is calculated. Here, as shown in FIG. 6B, it is assumed that the current sampling point is positioned at a point sp(j) on the scheduled path locus TRJ (in this example, a straight line) on the XY-plane, and the tool path sample point in the three-dimensional space at this time is the point ep(j).

Then, the sampling candidate point q1 separated from the current sampling point sp(j) by a predetermined distance ΔL is calculated on the scheduled path locus TRJ (step S311 in FIG. 5).

Then, the tool T is virtually arranged on the X, Y axis coordinates of the sampling candidate point q1 calculated in above step S311 from the upper side in FIG. 6A such that the tool T does not interfere with the curved-surface S but comes precisely into contact with the curved surface S, and then the tool interference avoidance calculation is executed (step S312) The tool position at this time is called a tool path sample candidate point eq1.

Details of the tool interference avoidance calculation in step S312 will be given as follow. FIGS. 7A and 7B are views showing a concept of an ordinary method of the tool interference avoidance calculation. The problem of this tool interference avoidance calculation is concluded as the problem to detect the Z axis coordinate contacting first to the curved surface S when the X, Y axis coordinates are set, then the tool T is arranged over the curved surface S on the X, Y axis coordinates, and then the tool T is put down gradually toward the curved surface S.

As shown in FIG. 7A, the tool can be set not to interface with the curved surface by virtually projecting the tool T onto the objective curved surface, then checking the interference between a number of sample points tsh (for the sake of simplicity, represented by a square mesh in FIG. 7A) on the curved surface S to which the tool T is projected and the tool T, and then calculating the coordinates of the tool position ep(j) as a center of the tool when the tool T comes into contact with the curved surface S.

The point calculated by such method such that the tool does not interface with the curved surface is the evaluation candidate point eq1.

Then, in step S313, a distance ΔLt between the current tool position ep(j) and the tool path sample candidate point eq1 in the three-dimensional space is calculated. Then, it is decided whether or not a difference between the distance ΔLt and the distance ΔL used in step S311 is less than a predetermined infinitesimal value E (step S314). As a result, if the difference between the distance ΔLt and the distance ΔL is smaller than the infinitesimal value ϵ, the evaluation candidate point eq1 is decided as the succeeding evaluation point ep(j+1)(step S315).

In contrast, if the difference between the distance ΔLt and the distance ΔL exceeds the infinitesimal value ϵ, the distance ΔLt is too far to employ. Therefore, the sampling candidate point is changed into another evaluation candidate point q2, for example, that is closer to the point sp(j) than the evaluation candidate point q1, on the scheduled path locus TRJ on the XY-plane (step S306), and then the process goes to step S302. Then, the tool path sample candidate point eq2 that is smaller than the infinitesimal value E is found by executing steps S312 to S314, and then this toll path sample candidate point eq2 is decided as the tool path sample point (step S315).

In order to calculate another sampling candidate point q2 on the scheduled path locus TRJ on the XY-plane, the dichotomy may be employed, for example. According to the above calculation, the point eq1 or the point eq2 that is closest to the distance ΔL can be obtained as the succeeding sampling point.

The above explanation is the operation of the tool path sample point deciding portion 21 in step S31 (FIG. 4), and the tool path sample point to evaluate the curved-surface state can be derived in the above manner. This process to get the tool path sample point is totally similar to the process to calculate the tool position descried later.

With the above, the detailed operations about the evaluation of the curved-surface state, the calculation of the curvature, and the decision of the curvature-based speed are explained.

Figure 8:
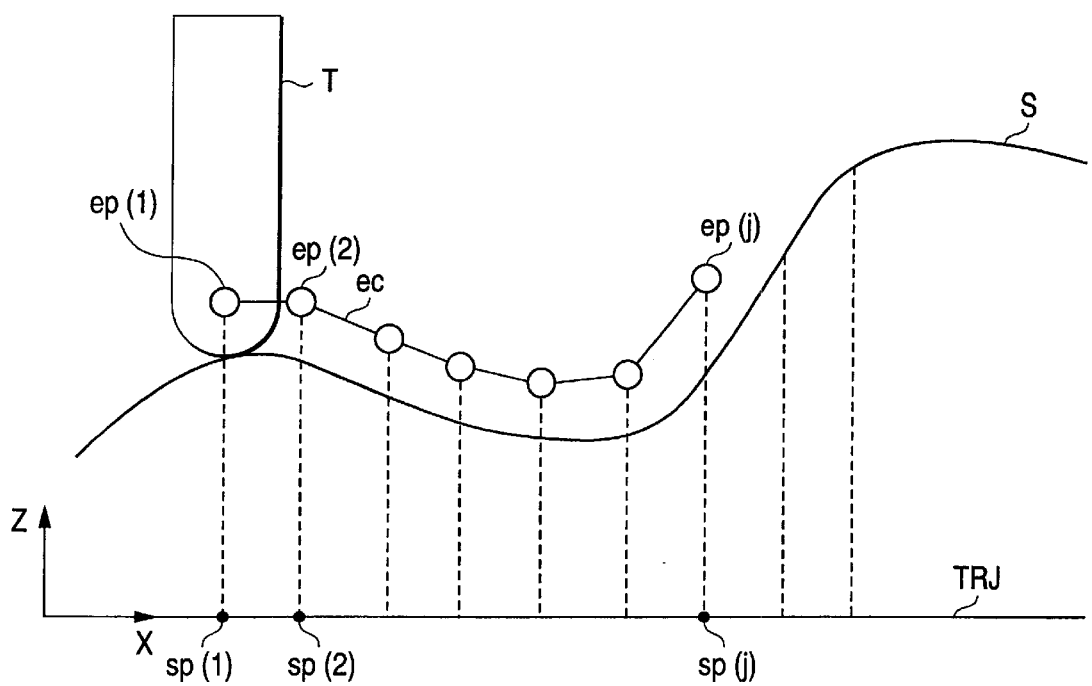
FIG. 8 is a view showing the tool path sample points calculated to evaluate the curved surface.
Figure 9:
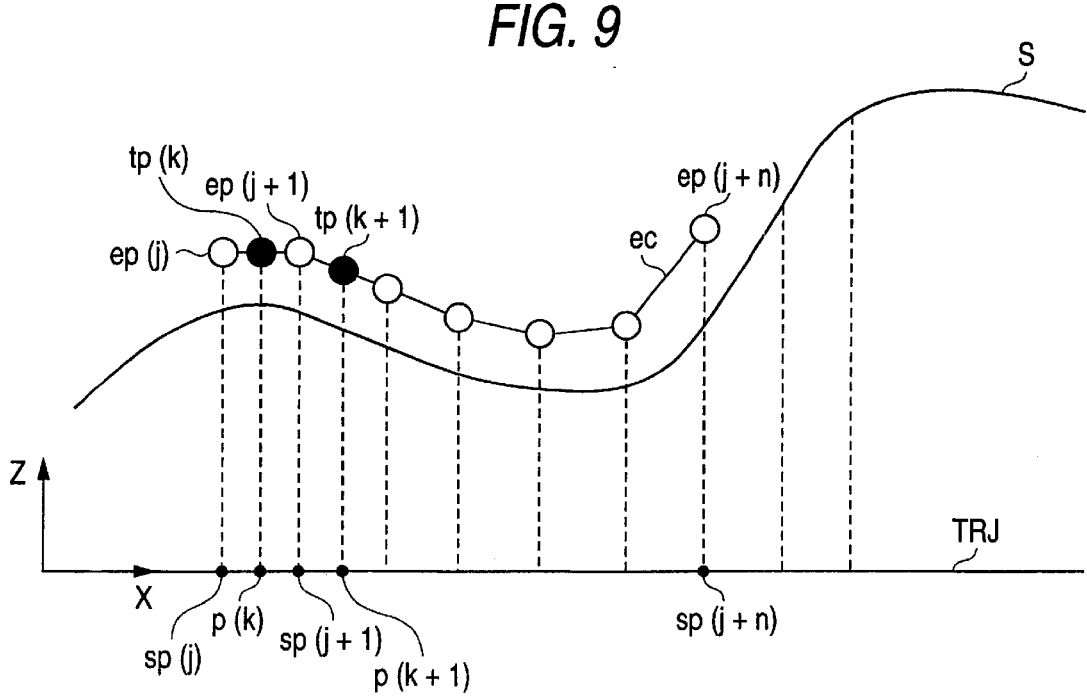
FIG. 9 is a view showing a relationship between the calculated tool path sample points and a tool position.

FIG. 8 is a view showing sampling points sp(1), sp(2), sp(j) on the scheduled path locus TRJ and the tool path sample points ep(1), ep(2), . . . , ep(j) calculated to evaluate the curved surface, calculated as mentioned above. In FIG. 8, T is the tool and ec is the evaluation line obtained by connecting the tool path sample points by using a straight line.

As the method of avoiding the interference between the tool and the curved surface, as shown in FIG. 7B, in addition to the above-mentioned method, the tool can be prevented from interfering with the curved surface by calculating an offset curved surface Sofst of the curved surface S and then deriving the coordinates of the center position ep(j) of the tool T from this offset curved surface Sofst.

In addition, as other interference preventing method, the method set forth in Patent Application Publication (KOKAI) Hei 6-83422, for example, may be employed. An outline of this method will be given as follows. First, curved-surface patches obtained by subdividing the curved-surface, that interferes in the tool, are roughly extracted by using the worked curved-surface including sphere tree.

Then, interfering finer curved-surface patches are extracted by using the interference check based on the bilinear patch, that approximates the curved-surface patches, while subdividing the extracted curved-surface patches. The interference avoidance calculation between the resultant planar patches and the tool is executed by executing this process until the curved-surface patches are subdivided into enoughly-flat curved-surface patches.

Next, a detailed operation of the tool position data forming unit 30 in step S4 in FIG. 2 will be explained with reference to a flowchart in FIG. 10 and a concept used to calculate a distance from the current tool position to the end point in FIG. 11 hereunder. In the flowchart in FIG. 10, it is decided whether or not a deceleration flag FD_FLG of the tool speed (described in detail later) is 1 (step S41). At first, the deceleration flag FD_FLG of the tool speed is set to 1 by the initialization.

If the deceleration flag FD_FLG=1, an override rate Rovr is calculated by a following equation (step S42).

$$Rovr=(N-Nmin)/(Nmax-Nmin)$$

Where

N is the data number of the tool position in the tool position data buffer portion 34, Nmin is the minimum data number of the tool positions which are stored in the tool position data buffer portion 34 to issue the tool position calculation start command, i.e., the tool move (working start) command, Nmax is the data number of the tool positions in the tool position data buffer portion 34, that allow the tool moving speed to return to the normal state, and Rovr is allowance of the tool position data stock.

Unless the deceleration flag FD_FLG=1, the data number of the tool positions in the tool position data buffer portion 34 is sufficient and the deceleration of the tool speed is not needed, and thus the override rate Rovr=1 is set (step S43) Then, the process goes to step S44.

In step S44, the curvature-based speed Fc at the current tool position is calculated by looking up the curvature-based speed at the tool path sample points whose curved-surface states are evaluated previously and stored in the evaluation data memory portion 24. The curvature-based speed Fc is calculated based on the curvature-based speed stored in the evaluation data memory portion 24 while using the current tool position on the scheduled path locus as a parameter. As shown in FIG. 9, normally the tool path sample point ep(j) being set previously does not coincide with the tool position tp(k). Accordingly, the curvature-based speed Fc is calculated by the interpolation method from two closest tool path sample points between which the current tool position is put.

Then, a set speed Vcom=Fc·Rovr by multiplying the curvature-based speed Fc by the override rate Rovr (step S45). This set speed Vcom and the safety speed described later are compared with each other, and then a smaller speed of them is decided as the command speed F (step S46).

The event that the override rate Rovr is small indicates that stock of the tool position data in the tool position data buffer portion 34 is small. For this reason, there is the possibility that the movement of the tool is stopped since the data of the tool position are in short in the middle of working and are not output. Therefore, the command speed is lowered by reducing the set speed Vcom to avoid such stop.

The tool interference avoidance calculation is executed based on the command speed F and the curved-surface data stored in the input data memory portion 12 not to cause the tool to interfere with the curved surface, and then the tool position is decided (step S47). The calculated tool position data are stored in the tool position data buffer portion 34 (step S48). Then, it is decided whether or not the formation of all tool position data is ended (step S49).

By the way, the safety speed used in above step S46 is calculated as follows. That is, the distance-to-end point calculating portion 31 calculates a distance from the current tool position to the end point on the curved surface, that corresponds to the end point position on the scheduled path locus, based on the curved-surface data stored in the input data memory portion 12. The scheduled path locus is treated as a plurality of moving commands in the numerically controlled system, and normally the discontinuity portion (e.g., OP2, OP4, OP6, etc. in FIG. 3A) of the scheduled path locus is treated as the end point position.

Figure 11:
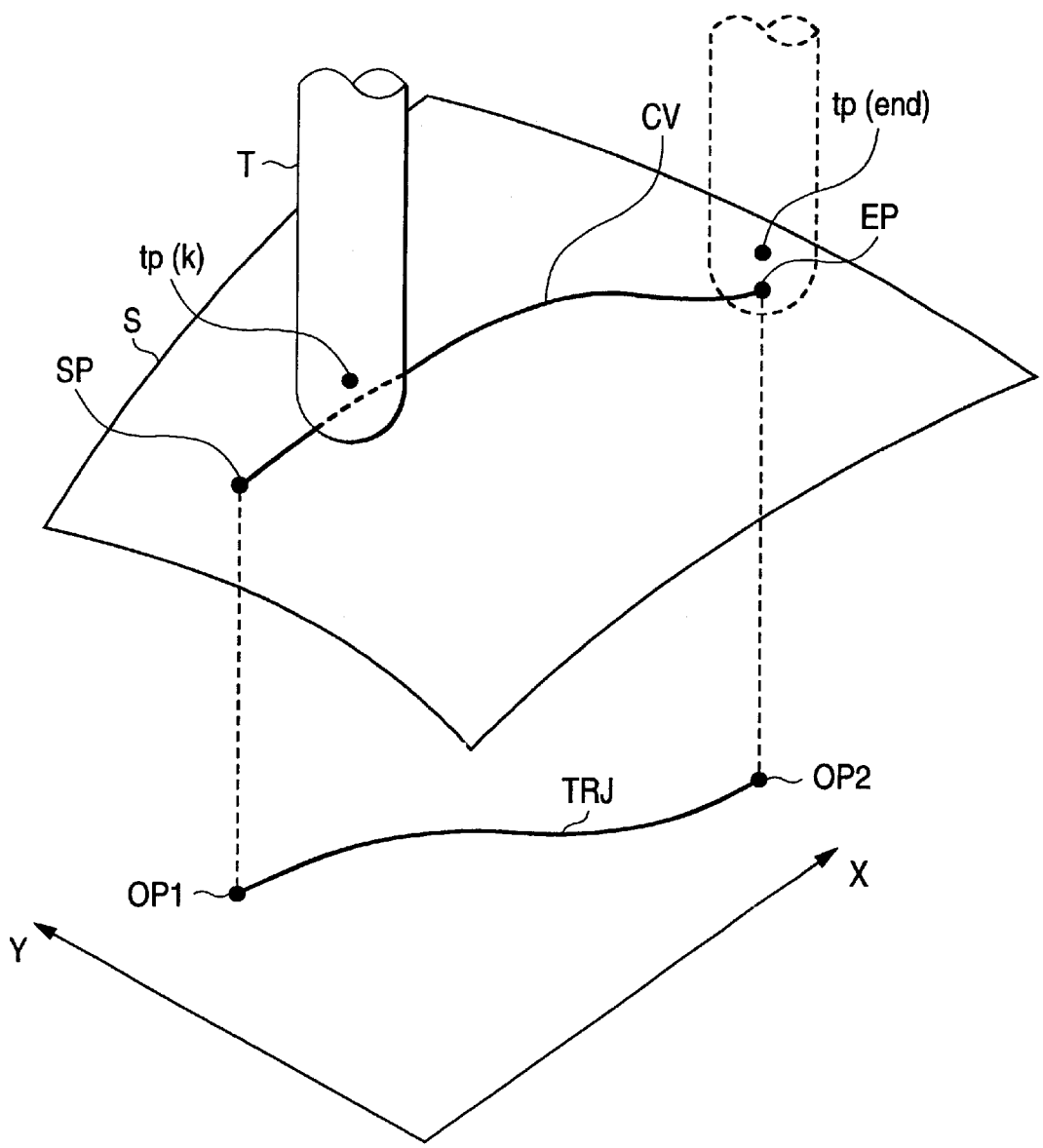
FIG. 11 is a view showing a concept of distance calculation from the current tool position to an end point.

Here, FIG. 11 is a view showing a concept of distance calculation from the current tool position to the end point. In FIG. 11, it is assumed that the scheduled path locus TRJ from the point OP1 to the point OP2 on the XY-plane is calculated. At this time, a curve CV is obtained by projecting the scheduled path locus TRJ onto the curved surface S, and the start point is SP and the end point is EP.

A point on the curve CV can be easily calculated by providing the X, Y axis coordinates on the scheduled path locus TRJ. The tool T travels on the curve CV from the start point SP corresponding to the point OP1 to the end point EP corresponding to the point OP2. Accordingly, the X, Y axis coordinates of the center position tp(k) of the tool T is located on the scheduled path locus TRJ from the point OP1 to the point OP2 and on the curve CV from the start point SP to the end point EP, and the tool T is arranged to come into contact with the curved surface S.

In FIG. 11, it is assumed that the current tool position is tp(k) and the tool position is tp(end) when the tool T is arranged on the end point EP of the curve CV. First, the distance Le between the tool positions tp(k) and tp(end).

Then, it is decided whether or not the tool can be stopped safely until the tool comes up to the end point EP, based on a following equation using the current speed command Vcom and the allowable acceleration B of the machine tool.

$$Vcom < \sqrt{(2Le \cdot B)}$$

As the result of decision, if the above condition is not satisfied, the tool cannot stop safely at the end point and thus the tool speed must be decelerated into the safety speed Vout calculated by a following equation. The safety speed Vout is the maximum allowable speed at the current tool position, that is allowed to stop safely by decelerating the tool speed within the range of the allowable acceleration until the tool goes from the current tool position to the end point.

$$Vout = \sqrt{(2Le \cdot B)}$$

Then, the smaller one of the current speed command Vcom and the safety speed Vout is decided as the command speed F.

Figure 10:
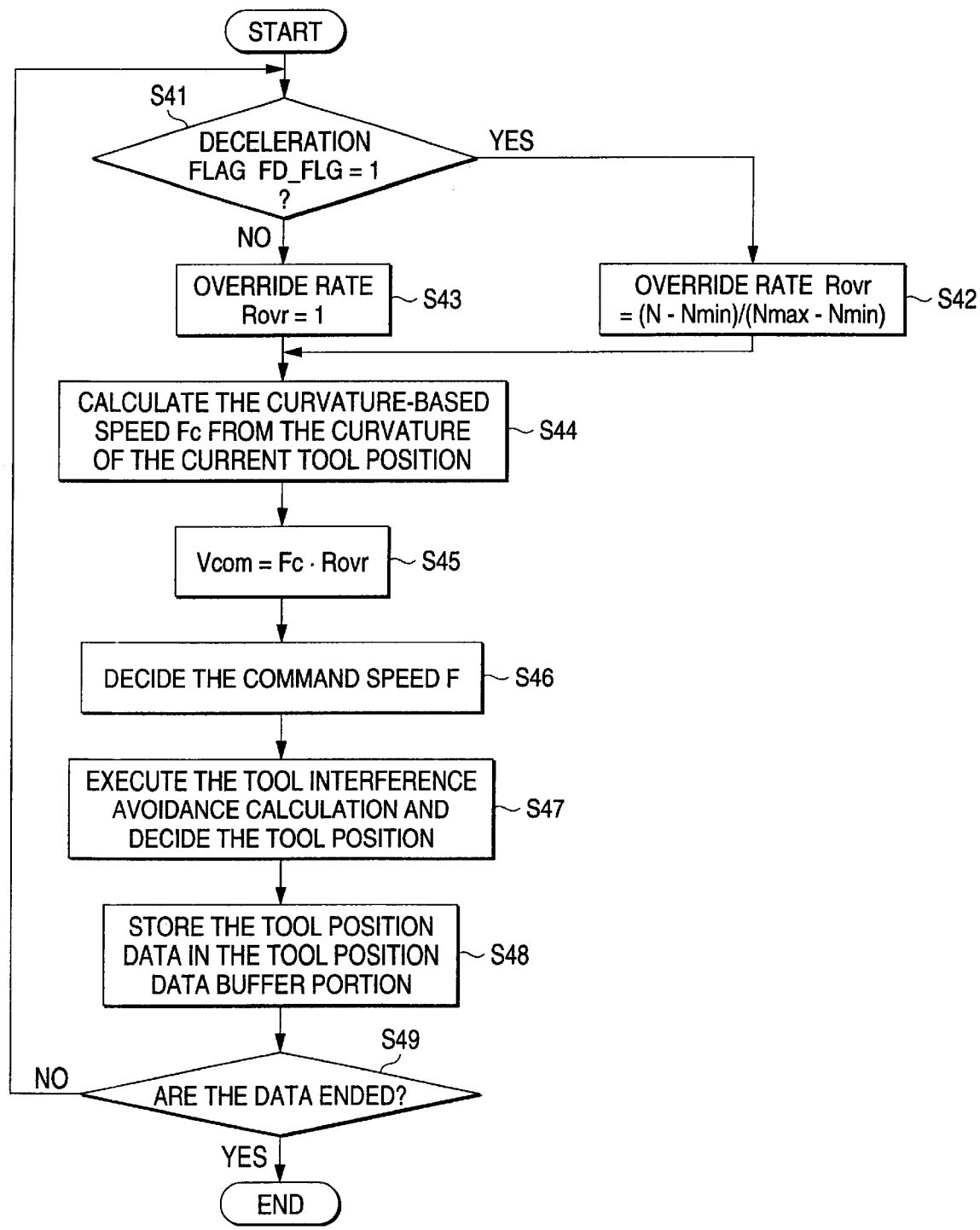
FIG. 10 is a flowchart showing a detailed operation of a tool position data forming unit in FIG. 1.

Next, the tool position is decided by executing the tool position avoidance calculation in step S47 in the flowchart of FIG. 10. This decision of the tool position is made by not forming the tool path data in response to the curved surface data and calculating the tool position based on the tool path data by the numerically controlled system in the prior art, but calculating the tool position based on the curved surface data without the interpolation of the tool position.

First, in step S47 of FIG. 10, the tool position deciding portion 33 decides the tool position as follows. That is, a distance $\Delta D = F \cdot \Delta T$ decided by the command speed F decided in step S46 and the sampling distance $\Delta T$ is calculated. The succeeding tool position is decided finally to a point separated by the distance $\Delta D$ after the interference avoidance calculation of the tool is executed by the same way as that to calculate the tool path sample point in step S312 of FIG. 5, as mentioned above.

Figure 12A:
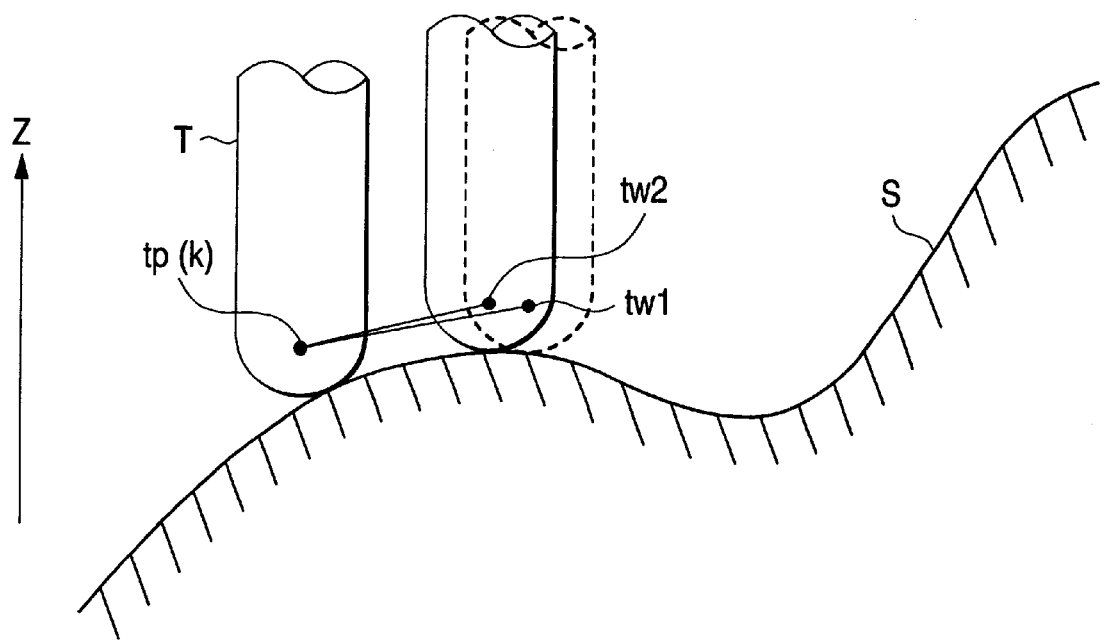
FIGS. 12A and 12B are views showing a concept to calculate a succeeding tool position from the current tool position on the curved surface.
Figure 12B:
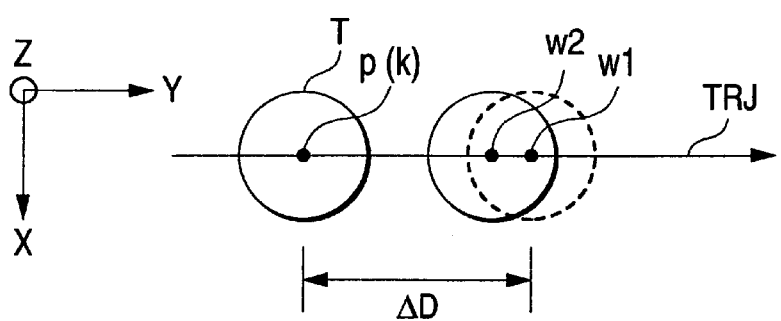

In the following, the tool position can be calculated by the same way as that used to calculate the tool path sample points in step S313 to step S316 of FIG. 5. FIGS. 12A and 12B are views showing a concept to calculate the succeeding tool position from the current tool position on the curved surface. In FIG. 12B, a temporary candidate point w1 separated from the point p(k) as the current tool position by the distance $\Delta D$ is calculated on the scheduled path locus TRJ on the XY-plane. A tool position tw1 obtained when the tool is arranged virtually on the X, Y axis coordinates of this temporary candidate point w1 from the upper side in FIG. 12A such that the tool does not interfere with the curved surface but comes precisely into contact with the curved surface is decided as a tool position candidate point.

Then, a distance $\Delta Dt$ from the current tool position tp(k) to the tool position candidate point tw1 in the three-dimensional space in FIG. 12A is calculated. Then, it is decided whether or not a difference between the distance $\Delta Dt$ and the distance $\Delta D$ is smaller than a predetermined infinitesimal value e. As the result, if the difference between the distance $\Delta Dt$ and the distance $\Delta D$ is less than the predetermined infinitesimal value e, the tool position candidate point tw1 is decided as the succeeding tool position tp(k+1).

In contrast, if the difference between the distance $\Delta Dt$ and the distance $\Delta D$ exceeds the predetermined infinitesimal value e, the distance $\Delta Dt$ is too far to employ. Therefore, the temporary candidate point is changed into another temporary candidate point w2 that is closer to the current tool position on the scheduled path locus TRJ on the XY-plane, for example, than the current temporary candidate point w1. Then, the tool position candidate point is detected by calculating again the distance $\Delta Dt$ from the current tool position tp(k) to the tool position candidate point tw2 in the three-dimensional space to find the tool position candidate point that can give the distance smaller than the infinitesimal value e. Then, such tool position candidate point is decided as the succeeding tool position tp(k+1).

The above explanation is the operation of the tool position deciding portion 33. The tool position data obtained as mentioned above are sent to the servo controller (not shown) and the numerically controlled machine tool is controlled.

The above tool interference avoidance calculation method can be carried out by the same way as that applied to calculate the tool path sample candidate point in step S312 of FIG. 5.

By the way, it takes a lot of time to execute the decision of the tool path sample point, the decision of the curvature and the curvature-based speed, the decision of the tool position, etc. Therefore, when stock of the tool position data in the tool position data buffer portion 34 runs out, the tool position data cannot be output to the numerically controlled machine tool and thus the movement of the tool stops. In some cases, the scratch-like tool trace due to such stop of the tool occurs on the working object. In order to prevent such tool trace, the tool position data number monitoring portion 35 operates as follows to prevent the unnecessary stop of the tool in the middle of working.

Figure 13:
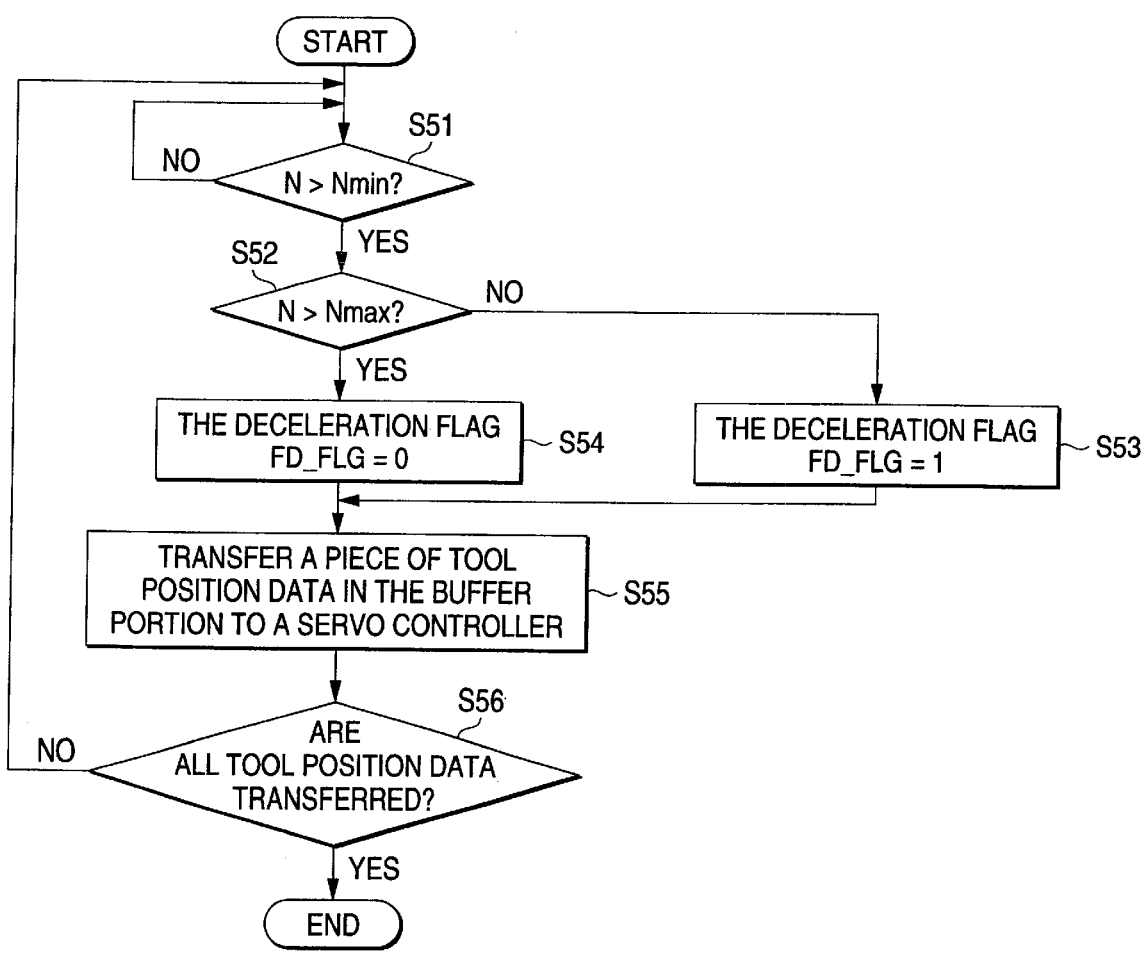
FIG. 13 is a flowchart showing an operation of a tool position data number monitoring portion in FIG. 1.

That is, in a flowchart shown in FIG. 13, it is decided whether or not the data number N of the tool position stored in the tool position data buffer portion 34 is larger than the allowable minimum value Nmin (step S51). If the data number N is larger than the allowable minimum value Nmin, it is decided that there is no possibility that the tool position is not decided in time in the middle of working and thus the working is not stopped. Then, the process goes to step S52. If the data number N is smaller than the allowable minimum value Nmin, there is the possibility that the tool position is not decided in time in the middle of working and thus the working is waited until the data number N exceeds the allowable minimum value Nmin (step S51).

Then, in step S52, if the data number N of the tool position stored in the tool position data buffer portion 34 is smaller than a predetermined value Nmax (Nmax>Nmin), stock of the tool position is slightly insufficient. Thus, in order to avoid the danger of the stop in the middle of working, the deceleration flag FD_FLG=1 of the tool speed is set (step S53). Then, the process goes to step S55.

In contrast, if the data number N of the tool position stored in the tool position data buffer portion 34 is larger than the predetermined value Nmax, the stock of the tool position data is sufficient unless the tool speed is decelerated. Hence, it is decided that the deceleration of the tool speed is not needed and the deceleration flag FD_FLG=0 is set (step S54) Then, the process goes to step S55. In this case, the deceleration flag FD_FLG is used in step S41 in the flowchart of FIG. 10 described above to select the override rate.

Then, in step S55, a piece of tool position data in the tool position data buffer portion 34 is transferred to the servo controller. Then, it is decided whether or not all tool position data are transferred (step S56).

The tool position data number monitoring portion 35 repeats above operations until the tool position data to be worked are out.

(Embodiment 2)

Figure 14:
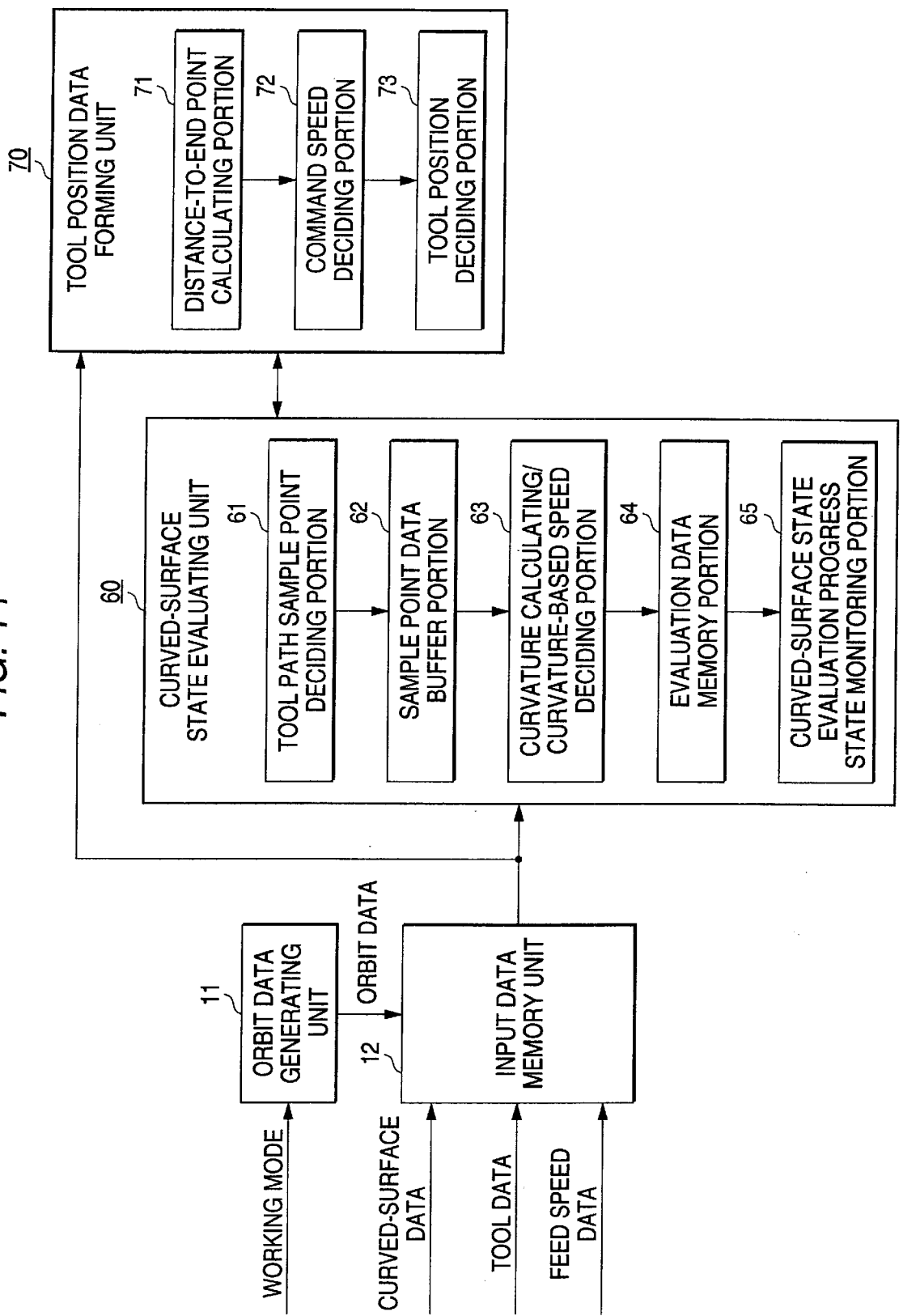
FIG. 14 is a block diagram showing a configuration of a numerically controlled system according to another embodiment of the present invention.
Figure 15:
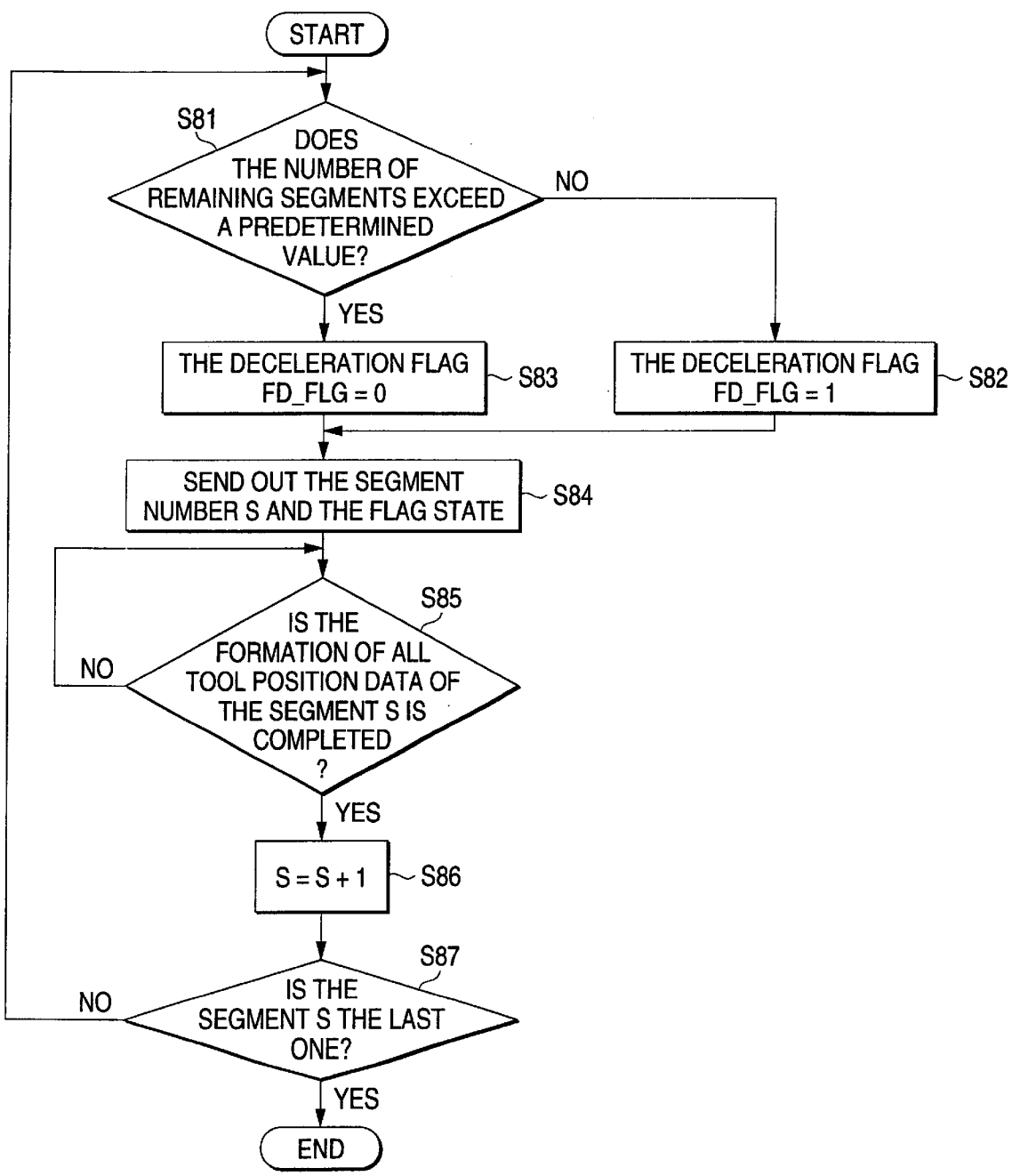
FIG. 15 is a flowchart showing an operation of a curved-surface state evaluation progress state monitoring portion in FIG. 14.

FIGS. 14 and 15 show another embodiment of the present invention. FIG. 14 is a block diagram showing a configuration of a numerically controlled system according to another embodiment of the present invention. FIG. 15 is a flowchart showing an operation of a curved-surface state evaluation progress state monitoring portion. In FIG. 14, a curved-surface state evaluating unit 60 includes a tool path sample point deciding portion 61, a sample point data buffer portion 62, a curvature calculating/curvature-based speed deciding portion 63, an evaluation data memory portion 64, and a curved-surface state evaluation progress state monitoring portion 65.

The tool path sample point deciding portion 61 decides the tool path sample points in unit of segment based on the curved data stored in the input data memory unit 12 to evaluate the curved surface. The sample point data buffer portion 62 stores temporarily the tool path sample points decided by the tool path sample point deciding portion 61 in the form of segment.

The curvature calculating/curvature-based speed deciding portion 63 evaluates the to-be-worked curved-surface state in unit of segment based on the curved data stored in the input data memory unit 12 to correspond to the scheduled path locus, and then calculates the curvature and the curvature-based speed in response to the tool path sample points. The evaluation data memory portion 64 stores the curvature and the curvature-based speed, that are the evaluation data at the tool path sample points, in response to the tool path sample points in the form of segment.

Where the segment is defined by a straight line, a circular arc, a curve, etc. and has a predetermined start point and a predetermined end point, and constitutes the scheduled path locus. Here the segment is used as a break unit of the data, as mentioned above. For example, the line segments OP1–OP2, OP3–OP4 on the XY-plane in FIG. 3A and the scheduled path loci TRJ having the start point OP1 and the end point OP2 on the XY-plane in FIG. 3B, or the like correspond to the segment.

The curved-surface state evaluation progress state monitoring portion 65 monitors the data number of the tool path sample points, that are stored in unit of segment in the evaluation data memory portion 64 of the curved-surface state evaluating unit 60, in unit of segment, and then controls the command speed in a command speed deciding portion 72 of a tool position data forming unit 70 described later.

The above explanation is the configuration of the curved-surface state evaluating unit 60.

In this manner, although details are described later, the reason for that the tool path sample points are handled in unit of segment will be given in the following. That is, when the tool position data is not decided in good time for the post step since the setting of the tool path sample points being set in real time is late, the tool position data are not output and thus the movement of the tool is stopped. If respective data are prepared in unit of segment, such an event can be prevented that supply of the tool position data is stopped in the middle of segment and thus the movement of the tool is stopped. Also, even if the tool speed is reduced to zero, i.e., the working is stopped temporarily, normally there is a small possibility that the worked quality is damaged at the end point of the segment because of the presence of the tool traces, etc.

The tool position data forming unit 70 includes a distance-to-end point calculating portion 71, the command speed deciding portion 72, and a tool position deciding portion 73. The tool position data forming unit 70 decides the command speed from the curvature-based speed and the safety speed at the tool position to be subsequently calculated, and then calculates sequentially the tool positions after the interference avoidance calculation between the tool and the curved surface is made based on this command speed. The tool position is the coordinate representing the tool position to be output by the numerically controlled system at a predetermined time interval, and the tool position data is collection of the coordinates representing the tool positions.

Then, a detailed configuration of the tool position data forming unit 70 will be explained hereunder. The tool position data forming unit 70 includes the distance-to-end point calculating portion 71, the command speed deciding portion 72, and the tool position deciding portion 73. The distance-to-end point calculating portion 71 calculates a distance from the current tool position to the end point. The command speed deciding portion 72 calculates a limit speed based on the current tool position and the distance to the end point calculated by the distance-to-endpoint calculating portion 71, then compares this limit speed with the curvature-based speed calculated by the curved-surface state evaluating unit 60, and then decides the lower speed of them as the command speed.

The tool position deciding portion 73 decides the tool positions, that are time-series position coordinates of the tool traced by the tool in working of the curved surface, based on the command data and the curved-surface data.

The tool position data forming unit 70 is constructed as above.

Next, an operation will be explained hereunder.

The tool path sample point deciding portion 61 of the curved-surface state evaluating unit 60 first sets the segments by dividing the scheduled path locus appropriately, normally using the start point and the end point as one partition. For example, the segments are the line segments OP1–OP2, OP3–OP4, etc. on the XY-plane in FIG. 3A, as described above. Then, the tool path sample point deciding portion 61 sets the sampling points on the segments, and then calculates the tool path sample points by virtually arranging the tool in response to the sampling points not to interfere with the curved surface.

The succeeding tool path sample point separated from the calculated tool path sample point by the predetermined distance ΔD is calculated such that the tool does not interfere with The curved surface. The calculated succeeding tool path sample points are stored sequentially in the sample point data buffer portion 62. The process of deciding the tool path sample point is similar to the tool path sample point deciding method explained in Embodiment 1.

Three successive points are picked up sequentially from the tool path sample points in the sample point data buffer portion 62, then calculates the curvature passing through these three points and the curvature-based speed decided previously in response to the curvature, and then stores them in the evaluation data memory portion 64. This operation is repeated until the operations for the concerned segments are completed, and then the evaluation data are stored sequentially in the evaluation data memory portion 64. In addition, the curvatures at respective tool path sample points on the succeeding segment are calculated, and then the process is ended when the decision of the curvature and the curvature-based speed for all segments is completed.

Next, a detailed operation of the curved-surface state evaluation progress state monitoring portion 65 will be explained with reference to a flowchart in FIG. 15. The curved-surface state evaluation progress state monitoring portion 65 first checks whether or not the number of the segments stored in the evaluation data memory portion 64 of the curved-surface state evaluating unit 60 and the remaining number of the segments exceed a predetermined value (step S81).

If the number of remaining segments is less than the predetermined value, the progress of the evaluation of the curved-surface state is delayed and thus the deceleration flag FLG of the tool speed is set to 1 (step S82). Then, the process goes to step S84. If the number of remaining segments is more than the predetermined value, the deceleration flag FLG of the tool speed is set to 0 (step S83). Then, the process goes to step S84.

In step S84, the segment number S and the flag state are sent out to the tool position data forming unit 70. The tool position data forming unit 70 starts the calculation of the tool position in answer to the output state of the deceleration flag FLG. The curved-surface state evaluation progress state monitoring portion 65 checks the segment number in the evaluation data memory portion 64 until the formation of all tool position data of the segment number S is completed by the tool position data forming unit 70, and then waits for the output of the next flag state (step S85).

If the formation of all tool position data of the segment number S is completed by the tool position data forming unit 70, the segment number S is incremented by one (step S86). Then, it is decided whether or not the segment number S is the last one (step S87). Then, the process returns to step S81 wherein the number of the segments stored in the evaluation data memory portion 64 is checked and the flag state is output.

The tool path sample points stored in the evaluation data memory portion 64 in unit of segment are used in the command speed deciding portion 72 of the tool position data forming unit 70 to decide the command speed, and then cleared.

The above explanation is the detailed operation of the curved-surface state evaluating unit 60 in FIG. 14.

Figure 16:
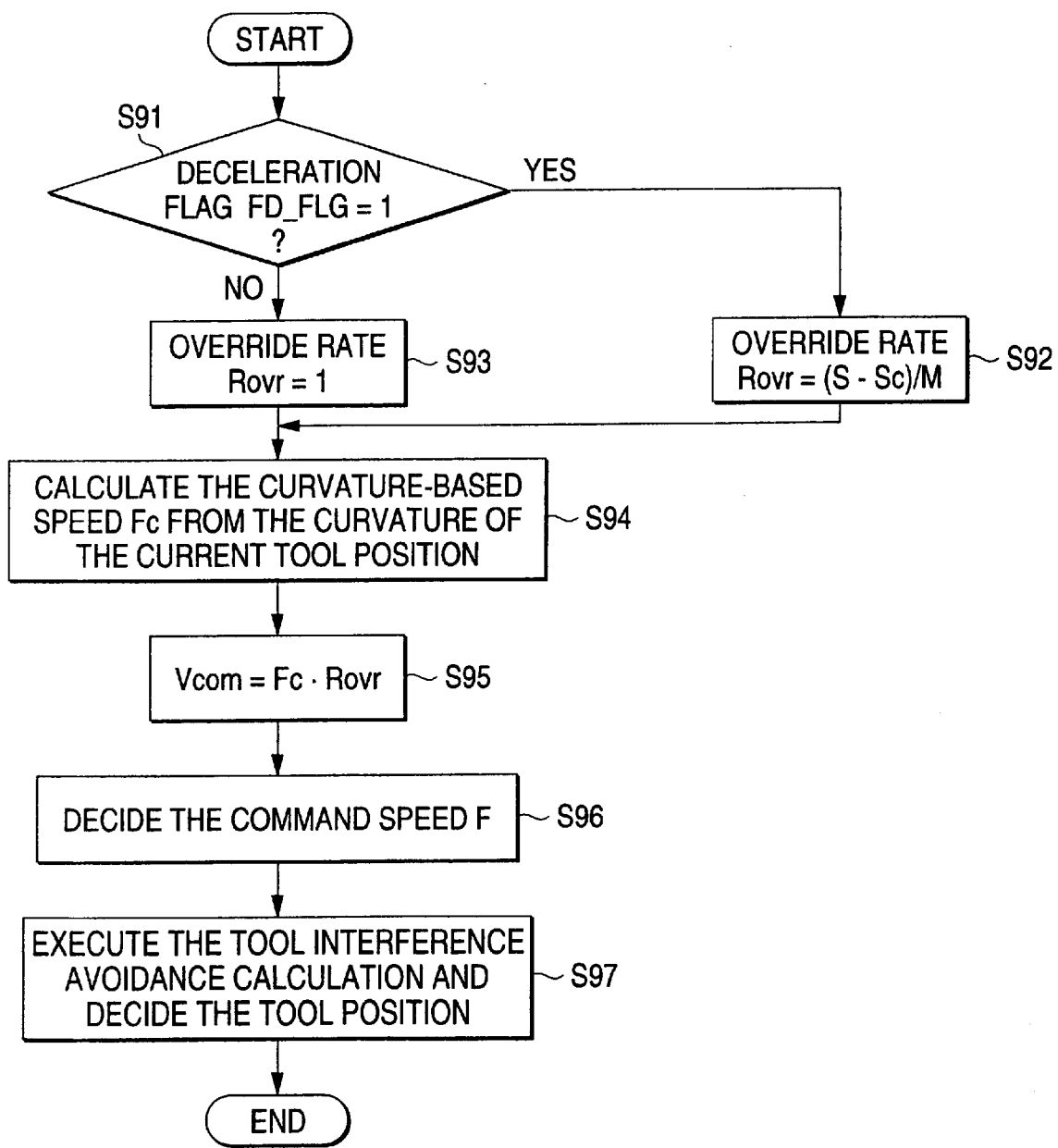
FIG. 16 is a flowchart showing an operation of a tool position data forming unit in FIG. 14.

Next, an operation of the tool position data forming unit 70 in FIG. 14 will be explained with reference to a flowchart in FIG. 16 hereunder. First, like the distance-to-end point calculating portion 31 in FIG. 1, the distance-to-end point calculating portion 71 calculates the distance from the current tool position to the end point. The command speed deciding portion 72 decides whether or not the state of the deceleration flag FLG in the data sent from the curved-surface state evaluation progress state monitoring portion 65 is 1 or 0 (step S91). If the deceleration flag FLG=1, the override rate Rovr is calculated by a following equation using the transmitted segment number (step S92).

$$Rovr = (S-Sc)/M$$

Where

S is the segment number in which evaluation of the curved-surface state is finished in the curved-surface state evaluating unit 60, Sc is the segment number in which the formation of the tool position data have already been finished by the tool position data forming unit 70, M is a predetermined integer, e.g. 5 or so, and (S−Sc)/M is the preceding degree in the progress of evaluation, i.e., the allowance.

In contrast, if the deceleration flag FLG=0 in step S91, the deceleration of the tool speed is not required and thus the override rate Rovr is set to 1 (step S93). Then, the process goes to step S94. In step S94, the curvature-based speed Fc is calculated from the curvature at the current tool position. The curvature-based speed Fc can be calculated by the same way as that in step S44 in FIG. 10, based on the evaluation data prepared slightly precedingly by the curved-surface state evaluating unit 60.

The operations in step S95 to step S97 are similar to those in step S45 to step S47 in FIG. 10, and thus the command speed F and the tool position are decided and output. In this case, in this embodiment, the tool position data buffer portion is not provided to the tool position data forming unit 70 and the calculated tool position data are sent out directly to the servo controller. Of course, the data buffer may be provided as occasion demands.

Also, in the embodiment in FIG. 14, the remaining number of the evaluation data of the curved-surface state is checked in unit of segment and the state of the deceleration flag is set. However, the state of the deceleration flag may be set in accordance with the stock number (remaining number) of the evaluation data irrespective of the segment.

In the above embodiment, normally the numerically controlled system can be implemented by using the microcomputer having one microprocessor. Also, respective tasks such as generation of the orbit data and storing of the input data, evaluation of the curved-surface state, decision of the command speed, decision of the tool position, etc., for example, can be shared by using the microcomputer having a plurality of microprocessors, and thus the high speed processing can be achieved by executing these processes concurrently in real time.

Then, in case plural tasks are executed concurrently in such manner, it can be effectively prevented that the tool is stopped in the course of working because of the uneven progress of respective tasks if the tool speed is controlled by monitoring the data number of the tool position and the stock number of the evaluation data.

Also, in the above embodiment, the curved-surface state evaluating unit 20 arrange virtually the tool to calculate respective evaluation points such that the tool comes into contact with the worked surface and the distance to the succeeding evaluation point becomes ΔL constant. Also, in order to increase the data processing speed, for example, the evaluation data can be obtained by setting the evaluation points at an equal distance on the scheduled path locus TRJ in FIG. 6B. In addition, the evaluation precision can be improved by setting the distance ΔL between the evaluation points considerably smaller than the feed distance ΔD=F·ΔT of the tool.

As described above, in respective embodiments, the evaluation of the curved-surface state to be worked is performed and also the tool speed is decided appropriately based on the evaluation result. In addition, the tool position is calculated directly according to the curved surface to be worked. Accordingly, the curved surface can be worked at the appropriate working speed according to the curved-surface state and thus the worked quality can be improved. Also, formation of the tool path data prepared by the CAD/CAM system in the prior art can be omitted. The productivity can also be improved.

Further, the evaluation of the curved-surface state made by the curved-surface state evaluating unit 20 and the decision of the tool position made by the tool position data forming unit 30 are executed in real time while executing slightly precedingly the evaluation of the curved-surface state made by the curved-surface state evaluating unit 20. Therefore, the capacity of the evaluation data memory portion 24 of the curved-surface state evaluating unit 20 and the evaluation data memory portion 64 of the curved-surface state evaluating unit 60 can be reduced and thus the system becomes inexpensive. Also, the overall processing time can be reduced and thus the productivity can also be improved.

If there is the possibility that the formation of the tool position data and the evaluation data is performed in time, the moving speed of the tool can be decelerated by providing the tool position data number monitoring portion 35 and the curved-surface state evaluation progress state monitoring portion 65. Therefore, the unnecessary stop of the tool in the course of working can be avoided, and also generation of the tool traces, etc. due to the tool stop can be prevented.

In the above embodiments, the process applying portion of the system to be numerically controlled is the tool of the numerically controlled machine tool. But the present invention is not limited to the numerically controlled system of the machine tool. The present invention may be employed as the numerically controlled system of the robot system, etc. to achieve the similar advantages. As the robot system, for example, there are the robot system that can execute the finishing process of the processed surface by using the grindstone as the process applying portion, and others.

Since the present invention is constructed as explained above, advantages set forth in the following can be achieved.

A numerically controlled system of the present invention comprises evaluating means for forming evaluation data by arranging virtually a process applying portion of a system to be numerically controlled on a given scheduled path locus not to interfere with a processed surface of a processing object and by setting a plurality of evaluation points to evaluate a state of the processed surface; command speed deciding means for deciding a command speed, at which the process applying portion is moved, based on the evaluation data; and process applying portion position data forming means having process applying portion position deciding means for deciding a process applying portion position to be given to the numerically controlled system based on the command speed and a shape of the processed surface such that the process applying portion does not interfere with the processed surface; wherein an operation of the evaluating means and an operation of the process applying portion position data forming means are executed in real time. Therefore, since the command speed at which the process applying portion is moved is decided based on the evaluation data, the appropriate command speed can be decided in response to the state of the processed surface. Also, since the process applying portion position is decided by arranging virtually the process applying portion to come precisely into contact with the processed surface, increase of an amount of data to be prepared can be suppressed. In addition, since the formation of the evaluation data and the decision of the process applying portion position are executed in real time, the overall processing time can be shortened. Accordingly, the quality of the process can be improved without damage of the productivity.

Then, the process applying portion position data forming means includes process applying portion position data storing means for storing process applying portion position data and process applying portion position data number monitoring means for issuing a deceleration command when a data number stored in the process applying portion position data storing means is less than a predetermined value, and the command speed deciding means decides the command speed based on a moving standard speed and the deceleration command. Therefore, since the process applying portion speed is decelerated by issuing the deceleration command when the data number of the process applying portion positions is reduced smaller than the predetermined value, it can be prevented that the decision of the process applying portion position is not performed in time in the middle of processing and thus the movement of the process applying portion is stopped. As a result, it is possible to prevent generation of the scratch-like tool traces, etc. due to the stop of the tool.

In addition, the evaluating means includes evaluation data storing means for calculating a curvature of the processed surface of a processing object at evaluation points and a moving standard speed of the process applying portion to correspond to the curvature as evaluation data and storing the evaluation data, and evaluation progress state monitoring means for issuing a speed limiting command when a number of the evaluation data stored in the evaluation data storing means is reduced smaller than a predetermined value, and the command speed deciding means decides the command speed based on a moving reference speed and the speed limiting command. Therefore, since the process applying portion speed is decelerated by issuing the deceleration command when the number of the evaluation data stored in the evaluation data storing means is reduced smaller than the predetermined value, it can be prevented that the decision of the process applying portion position is not performed in time in the middle of processing and thus the movement of the process applying portion is stopped. As a result, generation of the scratch-like tool traces, etc. due to the stop of the tool can be prevented.

Further, the evaluating data storing means stores the evaluation data in unit of segment that is classified from a predetermined start point to a predetermined end point on a scheduled path locus, and evaluation progress state monitoring means for issuing a speed limiting command when a unit number of the segment stored in the evaluation data storing means is reduced smaller than a predetermined value. Therefore, since the process applying portion speed is decelerated by issuing the deceleration command when the unit number of the segment in the evaluation data stored in the evaluation data storing means is reduced smaller than the predetermined value, it can be prevented that the decision of the process applying portion position is not performed in time in the middle of segment and thus the movement of the process applying portion is stopped. In addition, since normally no trouble is caused by stopping once the process applying portion at the endpoint of the segment, it can be prevented that the process applying portion is stopped in the middle of the segment by handling the evaluation data in unit of segment. As a result, it is possible to prevent generation of the scratch-like tool traces, etc. due to the stop of the tool by preventing stop of the tool in the course of the segment.

Besides, a numerically controlling method of the present invention comprises the steps of forming evaluation data by arranging virtually a process applying portion of a system to be numerically controlled on a given scheduled path locus not to interfere with a processed surface of a processing object and by setting a plurality of evaluation points to evaluate a state of the processed surface; deciding a command speed, at which the process applying portion is moved, based on the evaluation data; and deciding a process applying portion position to be given to the numerically controlled system based on the command speed and a shape of the processed surface such that the process applying portion does not interfere with the processed surface; wherein formation of the evaluation data and decision of the process applying portion position are executed in real time. Therefore, since the command speed at which the process applying portion is moved is decided based on the evaluation data, the appropriate command speed can be decided in response to the state of the processed surface. Also, since the process applying portion position is decided by arranging virtually the process applying portion to come precisely into contact with the processed surface, increase of an amount of data to be prepared can be suppressed. In addition, since the formation of the evaluation data and the decision of the process applying portion position are executed in real time, the overall processing time can be shortened. Accordingly, the quality of the process can be improved without damage of the productivity.

What is claimed is:

1. A numerically controlled system comprising:
   an evaluating section forming evaluation data by arranging, virtually, a process applying portion of a system to be numerically controlled on a given scheduled path locus not interfering with a processed surface of a processing object and by setting a plurality of evaluation points to evaluate the processed surface;
   a command speed deciding section deciding a command speed, at which the process applying portion is moved, based on the evaluation data; and
   a process applying portion position data forming section having a process applying portion position deciding section for deciding a process applying portion position to be given to the numerically controlled system based on the command speed and shape of the processed surface such that the process applying portion does not interfere with the processed surface wherein operation of said evaluating section and operation of said process applying portion position data forming section are executed in real time.

2. The numerically controlled system according to claim 1, wherein said process applying portion position data forming section includes a process applying portion position data storing section for storing process applying portion position data and a process applying portion position data number monitoring section for monitoring number of data stored and issuing a deceleration command when the number of data stored in said process applying portion position data storing section is less than a predetermined value, and wherein said command speed deciding section decides the command speed based on a moving standard speed and the deceleration command.

3. The numerically controlled system according to claim 1, wherein said evaluating section includes an evaluation data storing section for calculating a curvature of the processed surface of a processing object at evaluation points and a moving standard speed of the process applying portion to correspond to the curvature as evaluation data and for storing the evaluation data and monitoring number of evaluation data stored, and an evaluation progress state monitoring section for issuing a speed limiting command when the number of the evaluation data stored in said evaluation data storing section becomes smaller than a predetermined value and wherein said command speed deciding section decides the command speed based on a moving reference speed and the speed limiting command.

4. The numerically controlled system according to claim 3, wherein said evaluating data storing section stores the evaluation data in units of segments that are classified from a start point to a an end point on a scheduled path locus, and said evaluation progress state monitoring section issues a speed limiting command when the number of segments stored in the evaluation data storing section becomes smaller than a predetermined value.

5. A numerical control method comprising:
   forming evaluation data by arranging, virtually, a process applying portion of a system to be numerically controlled on a given scheduled path locus not interfering with a processed surface of a processing object and by setting a plurality of evaluation points to evaluate a state of the processed surface;
   deciding a command speed, at which the process applying portion is moved, based on the evaluation data; and
   deciding a process applying portion position to be given to the numerically controlled system based on the command speed and a shape of the processed surface such that the process applying portion does not interfere with the processed surface, wherein formation of the evaluation data and decision of the process applying portion position are executed in real time.

* * * * *